United States Patent
Stöcker et al.

(10) Patent No.: US 11,025,784 B2
(45) Date of Patent: Jun. 1, 2021

(54) ROAMING METHOD

(71) Applicants: Carsten Stöcker, Hilden (DE); Torsten Dahmen, Gelsenkirchen (DE); Markus Ludwig Rothkeppel, Essen (DE); Ulrich Grepel, Kleve (DE)

(72) Inventors: Carsten Stöcker, Hilden (DE); Torsten Dahmen, Gelsenkirchen (DE); Markus Ludwig Rothkeppel, Essen (DE); Ulrich Grepel, Kleve (DE)

(73) Assignee: innogy Innovation GmbH, Essen (DE)

( * ) Notice: Subject to any disclaimer, the term of this patent is extended or adjusted under 35 U.S.C. 154(b) by 0 days.

(21) Appl. No.: 16/351,098

(22) Filed: Mar. 12, 2019

(65) Prior Publication Data
US 2019/0215404 A1    Jul. 11, 2019

Related U.S. Application Data

(63) Continuation of application No. PCT/EP2016/071425, filed on Sep. 12, 2016.

(51) Int. Cl.
*H04W 4/00*      (2018.01)
*H04M 15/00*    (2006.01)
(Continued)

(52) U.S. Cl.
CPC ....... *H04M 15/8038* (2013.01); *B60L 53/305* (2019.02); *B60L 53/65* (2019.02);
(Continued)

(58) Field of Classification Search
CPC .   H04M 15/66; H04M 15/8038; H04W 12/06; H04W 12/0808; H04W 4/14;
(Continued)

(56) References Cited

U.S. PATENT DOCUMENTS 9,171,268 B1    10/2015    Penilla et al.
9,371,007 B1     6/2016    Penilla et al.
(Continued)

FOREIGN PATENT DOCUMENTS

EP    2 495 844 A1    9/2012

OTHER PUBLICATIONS

Wikipedia, Gateway (telecommunications), webpage last edited on May 2, 2019, 2 pages https://en.wikipedia.org/wiki/Gateway_(telecomunications).
(Continued)

*Primary Examiner* — Joseph Arevalo
(74) *Attorney, Agent, or Firm* — Reinhart Boerner Van Deuren P.C.

(57) ABSTRACT

The invention relates to a roaming method for an electrical charging system with at least two subsystems. In the method, a charging data set is received through a communication module of a gateway device from a charging station assigned to the gateway device. The charging data set is forwarded by a peer-to-peer module assigned to the gateway device to a peer-to-peer application of a peer-to-peer network, and a roaming action is controlled by a roaming controlling means of the peer-to-peer application executed by at least a part of the nodes of the peer-to-peer network based on the received charging data set.

19 Claims, 6 Drawing Sheets

(51) Int. Cl.
  *H04W 4/24* (2018.01)
  *H04L 12/14* (2006.01)
  *B60L 53/65* (2019.01)
  *B60L 53/30* (2019.01)
  *B60L 53/68* (2019.01)
  *B60L 53/66* (2019.01)
  *H04W 12/088* (2021.01)
  *H04W 4/40* (2018.01)
  *H04L 29/08* (2006.01)
  *H04W 8/02* (2009.01)
  *H04W 12/06* (2021.01)
  *H04W 88/16* (2009.01)

(52) U.S. Cl.
  CPC ............ *B60L 53/66* (2019.02); *B60L 53/665* (2019.02); *B60L 53/68* (2019.02); *H04L 12/1446* (2013.01); *H04L 12/1453* (2013.01); *H04L 12/1467* (2013.01); *H04L 67/104* (2013.01); *H04M 15/66* (2013.01); *H04W 4/24* (2013.01); *H04W 4/40* (2018.02); *H04W 8/02* (2013.01); *H04W 12/06* (2013.01); *H04W 12/088* (2021.01); *B60L 2240/70* (2013.01); *H04W 88/16* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
  CPC ......... H04W 4/24; H04W 4/40; H04W 88/16; H04W 8/02
  USPC ..... 455/432.1, 426.1, 41.2, 418, 558, 414.2, 455/466, 411
  See application file for complete search history.

(56) References Cited

U.S. PATENT DOCUMENTS

| | | | |
|---|---|---|---|
| 2007/0094069 A1* | 4/2007 | Berman | G07B 15/02 |
| | | | 705/13 |
| 2010/0141205 A1 | 6/2010 | Tyler et al. | |
| 2010/0161482 A1 | 6/2010 | Littrell | |
| 2011/0035261 A1 | 2/2011 | Handler | |
| 2012/0005125 A1 | 1/2012 | Jammer | |
| 2013/0211988 A1 | 8/2013 | Dorn et al. | |
| 2014/0006137 A1 | 1/2014 | Melen et al. | |
| 2015/0166009 A1* | 6/2015 | Outwater | B60R 25/25 |
| | | | 701/2 |
| 2016/0012465 A1* | 1/2016 | Sharp | G06Q 20/18 |
| | | | 705/14.17 |
| 2016/0031338 A1 | 2/2016 | Penilla et al. | |
| 2017/0034688 A1* | 2/2017 | Kim | H04W 76/14 |
| 2017/0127230 A1* | 5/2017 | Enriquez | G06Q 20/085 |
| 2018/0054319 A9* | 2/2018 | Yazdiha | H04W 12/001 |
| 2018/0118045 A1* | 5/2018 | Gruzen | B60L 53/68 |
| 2018/0272886 A1* | 9/2018 | Stocker | G06F 21/64 |

OTHER PUBLICATIONS

Wikipedia, Peer-to-peer, webpage last edited on Jun. 2, 2019, 12 pages https://en.wikipedia.org/wiki/Peer-to-peer.

* cited by examiner

ROAMING METHOD

CROSS-REFERENCE TO RELATED PATENT APPLICATION

This patent application is a continuation of PCT/EP2016/071425, filed Sep. 12, 2016, the entire teachings and disclosure of which are incorporated herein by reference thereto.

FIELD

The invention relates to a roaming method for an electrical inlet and/or outlet system, in particular, a charging system with at least two subsystems. The invention further relates to an inlet and/or outlet system, in particular, a charging system, a gateway device of an inlet and/or outlet system, in particular, a charging system and a peer-to-peer application of a peer-to-peer network.

BACKGROUND

Nowadays, the number of electrical vehicles is constantly growing. One reason for the increasing number of electrical vehicles is the expansion of the network or system of charging stations. Although the number of charging stations increases, users of vehicles might be unable to use every charging station. In particular, charging stations may belong to different (charging) subsystems. There are different providers of charging stations and subsystems, respectively, wherein each provider may have different requirements or rules. Each provider may comprise an own subsystem of charging stations. For instance, each subsystem (of different providers) may comprise different user authentication and/or authorization processes, may use different communication protocols, may use different accounting techniques, etc.

The differences of charging subsystems result in that users (or their vehicles) registered in a first subsystem of a first provided are unable to charge or discharge their vehicle at a further charging station of a further subsystem. In order to charge a vehicle also at charging stations assigned to the further subsystem, the user and/or vehicle must also be registered in the further subsystem. Each registering may include storing of user data (including account data) in a server of a subsystem, generating a charging agreement between the user and the provider, etc.

In order to avoid that a user and/o vehicle must be registered in a plurality of subsystems it in known from prior art to use a roaming server providing a roaming method, as described hereinafter.

FIG. 1 shows a typical embodiment of a charging system 100 according to prior art. The charging system 100 comprises a first (charging) subsystem 102.1. The first subsystem 102 comprises a plurality of first charging stations 104.1. Each charging station 104.1 comprises a communication module 106.1 configured to communicate with a further communication module 108.1 of a remotely arranged first gateway device 110.1 via a communication connection 112.1. In particular, two or more first charging stations 104.1 are connected to a first gateway device 110.1. It shall be noted that the means of charging/discharging a vehicle or the like are generally known, and thus, are not depicted.

The first gateway device 110.1 is, in particular, a gateway to a first (central) server 114.1 (also called backend) for all connected first charging stations 104.1. The first gateway device 110.1 comprises a further communication module 116.1 configured to communicate with a further communication module 118.1 of the remotely arranged server 114.1 via a communication connection 120.1.

By way of example, a charging data set relating to a charging process of an electrical vehicle can be transmitted from a first charging station 104.1 to the first gateway device 110.1. The first gateway device 108.1 may forward the charging data set to the first server 118.1. The first server 118.1 may comprise an accounting module 122.1 configured to process the received charging data set. For instance, based on the received charging data set, comprising e.g. a user identifier and the charged power, and stored user data set, comprising e.g. a user identifier and user account data, the accounting module 122.1 may invoice the user for the charged power and energy amount, respectively.

As can be further seen from FIG. 1, the system 100 comprises a second subsystem 102.2 with similar elements 104.2 to 122.2 as the first subsystem 102.1. In particular, a second server 114.2, a second gateway device 110.2 and a plurality of second charging stations 104.2 are provided.

As previously described, issues may occur if an electrical vehicle is charged at a first charging station of the first subsystem and the first server of the first subsystem does not comprise a user data set corresponding to the electrical vehicle and user of the electrical vehicle, respectively, since the user and/or vehicle is only registered in the second subsystem.

In order to avoid that the electrical vehicle of said user cannot be charged at said first charging station, according to prior art, a roaming server 124 can be provided. The roaming server 124 comprises one or more communication modules 126 configured to communicate with respective communication modules 118.1, 118.2 of the first and second servers 114.1, 114.2.

The depicted roaming server 124 comprises a roaming module 128. The roaming module 128 enables that users registered only in the first subsystem 102.1 can also use charging stations 104.2 of the second subsystem 104.2. For instance, following the above example, the first server can forward the charging data set of a user or vehicle not registered in the first subsystem 102.1 to the roaming server 124. Then, the roaming server 124 may conduct a roaming action, e.g. process the charging data set, by conducting an accounting process based on the charging data set and the user data stored in the roaming server 124. For instance, all user data of the connected subsystems 102.2, 102.2 may be also stored in the roaming server 124.

The roaming server 124 or roaming platform 124 is configured to act as a balancing module and clearing house, respectively, between the at least one two subsystems 102.1, 102.2.

However, a drawback of these prior art systems is the complex mechanism required to securely process a roaming process. In particular, the process and storage of confidential data (user data, provider data, charging data, etc.) is difficult and requires a high security efforts. Data privacy is especially difficult to achieve as movement tracking of individual users can be done by accessing the central database and analyzing the charging transactions.

In particular, a drawback of such a roaming system is the server-client structure of these systems. Usually, as described above, a central roaming server is used for conducting the roaming processes. A further disadvantage of server-client structures of this kind, particularly the server (or platform), apart from the high transaction costs, is that the central instance or central server manages confidential data including e.g. user data, authorization data, provider data, charging data or the like. A persistent problem affecting the central instance is that of protecting the confidential data stored on one or more roaming server(s) from access by unauthorized third parties. In particular, a high degree of security expenditure is required, in order to prevent said data from being tampered with. This in turn leads to even higher transaction costs. A further disadvantage is the complex and costly infrastructure for providing the described server-client structure.

Therefore, it is an object of the present invention to provide a roaming method, which enables to conduct roaming processes/actions more efficient and, at the same time, with a higher security level.

BRIEF SUMMARY

The object is solved according to a first aspect of the present invention by a roaming method for an electrical inlet and/or outlet system, in particular, a charging system with at least two (electrical charging) subsystems according to claim 1. The roaming method comprises:
- receiving a charging data set through a communication module of a gateway device from a charging station assigned to the gateway device,
- forwarding the charging data set by a peer-to-peer module assigned to the gateway device to a peer-to-peer application of a peer-to-peer network, and
- controlling at least part of a roaming process by a roaming controlling means of the peer-to-peer application executed by at least a part of the nodes of the peer-to-peer network based on the received charging data set.

In contrast to prior art methods, the roaming process, at least one roaming action of at least one roaming process, can be conducted in a more efficient and more secure way by at least controlling a part of the roaming process by a roaming controlling means of a peer-to-peer application executed by at least a part of the nodes of a peer-to-peer network. In other words, the roaming process can be managed and controlled without a central instance but by a peer-to-peer application of a peer-to-peer network. By the fact that instead of a central server or a platform, a peer-to-peer network (also called a framework) undertakes the in particular tamper-proof controlling of the roaming process between at least two charging subsystems, by means of a peer-to-peer application, high security standards are achieved in that all computers (peer nodes or simply nodes) in the peer-to-peer network, at least a part of the nodes in the peer-to-peer network, at least monitor(s) roaming process, in particular, by executing the roaming controlling means. Thereby, the transaction costs can be significantly reduced. No central, superior platform, server, cloud, etc. is required. The complexity of managing and controlling a roaming process can be significantly reduced. User data and other confidential data can be securely managed.

The present roaming method is used in an electrical inlet and/or outlet system, in particular, a charging system, comprising at least two (different) electrical (charging) subsystems. A subsystem may differ from another subsystem in the used communication protocols, the authentication process, accounting process, etc.

An electrical inlet and/or outlet system is configured to enable an exchange of electrical power. Exchanging electrical power include supplying electrical power to an electrically operated device and/or receiving electrical power from an electrical device. In order to exchange electrical power between the grid and an electrical device, an electrical charging station can be provided. A charging station according to the present application is configured to exchange electrical power with at least one connectable electrical device. A charging station, also called charging point, can be configured to exchange electrical power via a wired connection and/or an inductive connection. A charging station can be a stand-alone device or integrated in a multi-function device, such as a street lamp.

Non exhaustive examples of electrical devices connectable with a charging station according to the present application comprise any kind of vehicles including cars, trucks, construction vehicles, fork lifters, airplanes, drones, boats, bikes, etc., any kind of mobile devices, such as smart phones, entertainment devices, working tools, mobile robots, etc., any transportable electric devices, such as batteries, refrigerators, lighting systems, water pumps, etc., and/or any transportable power generation devices, such as fuel cells, mobile power generators, etc.

An electrical device according to the application is characterized in that it can consume electrical power (which can be taken out from the electrical grid) and/or it can generate power (which can be fed into the electrical grid). Such an device can be connected to the grid at one or more different locations. Electrical power consumed and/or produced by an electrical device can be delivered and e.g. billed based on a contract with an electrical inlet and/or outlet subsystem or the provider of said subsystem.

It shall be understood that the same solutions described here can be used for roaming in the case of parking systems and access management systems.

In particular, a charging system and a respective subsystem, respectively, is configured to enable the charging and/or discharging of electrical storage devices, such as batteries. A preferred example of an electrical storage device may be an electrically operated vehicle comprising all kinds of hybrid vehicles and solely electrically operated vehicles.

Generally, in order to conduct an exchanging process, in particular, a charging process including e.g. an identification action and exchanging, in particular, charging action, an electrical connection (e.g. via a charging cable) can be established between a charging station and an electrical device, such as an electrical vehicle.

A charging station may comprise a wired and/or wireless communication connection with a (remotely arranged) gateway device assigned to said charging station. The gateway device may provide a gateway to a server of the respective subsystem for a plurality of charging stations connected to said gateway device. In addition, as will be described hereinafter, the present gateway device additionally provides a gateway to a (roaming) peer-to-peer network configured to network two or more subsystems.

The charging station, in particular, a communication module of the charging station, is configured to transmit a charging data set to a communication module of the gateway device via said communication connection. The charging data set is, in particular, related to an exchanging process, in particular charging process. This means that a charging data set may comprise information about an exchanging action, in particular, charging action to be conducted and/or a currently conducted exchanging action, in particular charging action and/or an already finished exchanging action, in particular, charging action.

The received charging data set is forwarded from the gateway device, e.g. by sending one or messages, to a peer-to-peer application of a peer-to-peer network by means of a peer-to-peer module. In particular, the charging data set received by a communication module of the gateway device can be provided to a peer-to-peer module assigned to the gateway device e.g. via a data connection between said modules.

In order to network a subsystem with the roaming peer-to-peer network, the subsystem may comprise at least one peer-to-peer module assigned to the gateway device. For instance, each gateway device of said subsystem may comprise a separate peer-to-peer module. Preferably, each peer-to-peer module is uniquely assigned to a respective gateway device. For instance, each gateway device can comprise a peer-to-peer module. Preferably, the peer-to peer module can be integrated in the gateway device.

It is also possible that a communication connection is provided between the gateway device and a (remotely arranged) peer-to-peer module assigned to said gateway device. This means that the peer-to-peer module can at least communicate and/or act on behalf of the gateway device. For example, the peer-to-peer module can be partly formed by a separate processing device, such as mobile communication device (e.g. mobile phone, mobile computer, etc.), or it can run on a remote stationary processing device (e.g. in a data center). In case of a mobile communication device or a remote processing device the at least one gateway device may have a secure communication channel to the processing device (or mobile communication device) of the data center and the processing device itself may have a connection to the peer-to-peer network. In an embodiment the remote processing device may be a "gateway" to the peer-to-peer network. This means that the gateway device can securely communicate via its peer-to-peer module and the gateway to the peer-to-peer network.

In comparison to a client server charging system in which a roaming server provides a service (roaming process) and a client uses the service, these roles are cancelled in the present peer-to-peer network. Each participant (e.g. node) of the peer-to-peer network can use a service and the like and offer such a service. In particular, a peer-to-peer network is self-determined and/or self-organized (without any higher-level units). In the present case preferably each node and computer, respectively, of the peer-to-peer network comprises the (same) peer-to-peer application.

The peer-to-peer module is configured to communicate, e.g. send/receive messages to/from the peer-to-peer application. The peer-to-peer module may be a peer and node, respectively, of the peer-to-peer network. The peer-to-peer module provides at least a charging data set received from a charging station to the peer-to-peer application.

Based on the provided charging data set related to an exchanging process of an electrical device, in particular, to a charging process e.g. of a vehicle, a roaming process is controlled by the roaming controlling means of the peer-to-peer application. The roaming process may include at least one of the following actions:

Authentication action,
Forwarding action,
Accounting action.

Controlling one or more roaming process(es) includes the controlling of one action conducted by another means (e.g. authentication means, accounting means, etc.) wherein such a means can be implemented in the peer-to-peer application or a computing device controlled by the peer-to-peer application. Controlling one or more roaming process(es) may also include conducting the one more roaming actions by the roaming controlling means.

According to the present invention, a plurality of different exchanging subsystems, in particular, charging subsystems (also called isolated solutions) can be networked by a (roaming) peer-to-peer network comprising at least one (roaming) peer-to-peer application. Since the peer-to-peer application is specifically configured and provides, in particular, a roaming process, the present peer-to-peer applications enables e.g. user(s) of electrical vehicles to charge (or discharge) their electrical vehicles at all charging stations of the networked subsystems regardless of a contractual relationship between the user (and/or vehicle) and a provider of one of the plurality of subsystems.

According to a first embodiment of the roaming method according to the present invention, the charging data set may comprise at least one peer-to-peer identifier assigned to a user of an electrical device, in particular, a vehicle and/or a an electrical device, in particular, a vehicle of a user. Controlling a roaming process may comprise at least initiating an authentication action based on at least the peer-to-peer identifier. The authentication or authorization action, respectively, can comprise evaluating the validity of a received peer-to-peer identifier. Preferably, a received peer-to-peer identifier can be compared with stored and valid peer-to-peer identifiers. For instance, a list of valid peer-to-peer identifiers each corresponding to authorized users and/or vehicles can be stored in the peer-to-peer application and/or a storage arrangement controlled by the peer-to-peer application. Thereby, the roaming controlling means can conduct the authentication action or can cause another means, e.g. an authentication means, to conduct the authentication action. The roaming controlling means may be configured to provide the authentication result associated with a specific charging data set to the gateway device which previously transmitted said charging data set to the peer-to-peer application.

According to a preferred embodiment, an exchanging action, in particular, a charging action may be only released upon a provision of a positive authentication result by the peer-to-peer application to the charging station via the gateway device. A charging action may be the supply or receipt of electrical current from a charging station to an electrical device, in particular, vehicle or vice versa. In particular, a charging action (and thus, also further roaming actions) may be only conducted upon a positive authentication process.

The charging data set may include at least the peer-to-peer identifier of the user and/or electrical device, e.g. vehicle which desires to exchange electrical power with a charging station. Such a charging data set may relate to a charging action to be performed. It shall be understood that the identifier can be also assigned to a company which is owner of one or more electrical devices, in particular, vehicles.

Only in the case the received peer-to-peer identifier corresponds to one of the stored peer-to-peer identifiers (e.g. is identical with one of the stored peer-to-peer identifiers), the authentication result of the authentication process may be positive. Otherwise, the authentication result of the authentication process may be negative. Then, the roaming process including the charging action may be cancelled.

Based on the received authentication result, the charging station may control a switch configured to establish an electrical connection with the electrical device, in particular, vehicle to be charged/discharged. For instance, upon receipt of a positive authentication result, the switch may be closed in order to allow a current flow. Since the authentication action may be controlled and handled by the peer-to-peer application, the authentication action can be promptly performed. The release of the charging action may occur (almost) in real-time. At the same time, it may be ensured that only authorized vehicles and/or users can use said charging station.

It shall be understood that there may be two independent authentication actions. For example, one (conventional) authentication action for releasing or starting the charging process and conducted by one or more server of a subsystem and the above described further authentication process for enabling users not registered in the subsystem of the charging station to be used. Preferably, the authentication actions can be combined to a single authentication action at least partly controlled by the peer-to-peer application.

Furthermore, according to a preferred embodiment of the present invention, the charging data set may comprise at least one subsystem identifier. Controlling a roaming process may comprise at least initiating a forwarding action for forwarding the charging data set to at least one further peer-to-peer module assigned to at least one further gateway device of a further subsystem based on at least the subsystem identifier. The subsystem identifier may uniquely identify a subsystem. For instance, the peer-to-peer identifier and the subsystem identifier can be combined to a single identifier. The subsystem identifier may indicate the subsystem associated with the (charging or discharging) vehicle and/or user of the (charging or discharging) vehicle. In other words, the user and/or vehicle can be registered in said subsystem.

For instance, a user and/or electrical device, in particular, vehicle may comprise an agreement with a first provider for using first charging stations of a first charging subsystem (of the first provider). The first subsystem identifier, e.g. part of a peer-to-peer identifier of said user and/or vehicle, may indicate that the user and/or vehicle is associated with said first subsystem. For instance, the subsystem identifier may be a unique code assigned to the first subsystem.

Alternatively or additionally, the peer-to-peer-application may comprise an identifier list, wherein each peer-to-peer identifier is stored together with the (unique) subsystem identifier of the at least one associated subsystem. Then, a subsystem identifier is implicitly comprised by a peer-to-peer identifier. In this case, the subsystem identifier may be the peer-to-peer identifier. The peer-to-peer application may identify the subsystem identifier based on a received peer-to-peer identifier and said identifier list (same may apply for a routing module of a gateway device).

In particular, based on the subsystem identifier and/or the stored subsystem identifier of the associated subsystem, the peer-to-peer application, preferably, the roaming controlling means may forward the charging data set to the respective further gateway device, e.g. the further peer-to-peer module assigned to the further gateway device. Since the forwarding action is at least initiated, preferably, conducted by the peer-to-peer application, the security level of the charging system can be further increased. The further gateway device may be assigned to the further subsystem which is associated with the user and/or vehicle involved in the charging process of the (forwarded) charging data set.

It may be also possible that a gateway device may send a request comprising an identifier of the user and/or electrical device to the peer-to-peer application in order to obtain a response comprising the subsystem identifier corresponding to said identifier of the user and/or electrical device. Then, the gateway device can initiate a forwarding process in order to transmit the received charging data set comprising said identifier to the respective subsystem and/or server.

A peer-to-peer identifier and/or a subsystem identifier can be received by the charging station from an electrical device, in particular the vehicle e.g. to be charged (or the respective user) in an arbitrary way. Then, the at least one identifier can be forwarded to the gateway device included in a charging data set. By forwarding the charging data set to the gateway device the charging data set of a user can be securely and promptly transferred to the subsystem in which the user and/or vehicle is registered.

Further, a user and/or electrical device may be only registered in the roaming peer-to-peer application. For instance, a user can have an electronic wallet in the peer-to-peer application. Based on the identifier, an exchange process can be accounted by the roaming peer-to-peer application. It is noted that a subsystem can be a 'private' subsystem comprising e.g. a charging station, e.g. a socket or plug of a building of a 'private' user. Said charging station can be registered in the peer-to-peer application. In addition to two or more subsystems each comprising charging stations, also a system only comprising an accounting module without charging station(s) can be integrated in a system according to the present application. Such an accounting module and system, respectively, can act as a payment gateway which transfers user with standard accounts (e.g. EURO accounts) onto the peer-to-peer application with a cryptocurrency account.

It has been found that the roaming peer-to-peer network and the respective peer-to-peer application can be advantageously used to provide a fleet management process. In a further embodiment (intelligent) charging of one or more fleet(s) may be orchestrated by the roaming peer-to-peer application, preferably, in combination with a Grid SCADA (Supervisory Control and Data Acquisition) and/or fleet management system. A central or decentral vehicle fleet management system may access to operations data of individual vehicles of a fleet, e.g. battery temperature, vehicle operations times, battery load level, historic battery charging cycles, driven elevations, battery aging parameters, location, estimated parking time, etc. One or more of these data can be gathered via a decentral telemetry data system and/or a central system. The intelligent fleet charging algorithm(s) may be applied to calculate when and/or how each vehicle should be charged. Thereby, all charging stations of the networked subsystems can be used for charging. The algorithm(s) may generate charging control message(s) to steer charging of individual vehicles of a fleet. Algorithm(s) generating the charging control messages can e.g. take a grid status and/or dynamic price(s) of e.g. different subsystems and/or required charging levels into consideration. In an embodiment charging schedule(s) may be sent to the vehicles by the algorithm(s) (e.g. smart contract) and/or the vehicle may create charging messages taking into consideration the preferred charging schedules. Each fleet controlled by the roaming peer-to-peer application can comprise a unique fleet identifier.

Preferably, the received charging data set can be forwarded by the further gateway device to a further server for further processing the charging data set. In particular, upon receipt of a charging data set from the peer-to-peer module (not from a charging station), the gateway device may automatically transmit the respective charging data set to the associated server. The further server assigned to the further subsystem may further process the charging data set. For instance, the further server may conduct an accounting action (and/or authentication action) based on charging data set (e.g. including a peer-to-peer identifier) and e.g. user data stored in the server and/or a database controlled by the further server.

According to a further embodiment of the present roaming method, the charging data set may comprise at least one peer-to-peer identifier assigned to a user of a vehicle and/or a vehicle of a user and at least one charging amount information. The peer-to-peer identifier may be the previously described peer-to-peer identifier. Controlling a roaming process may comprise at least controlling an accounting process for the charging process related to the charging data set based on at least the charging amount information and the peer-to-peer identifier. The charging data set may comprise at least one charging amount information. The charging amount information may be e.g. the energy amount or power charged (or discharged) and/or a charging time period (e.g. x,x h and/or load curve parameter(s)). Based on one more of this information and based on the (unique) peer-to-peer identifier of the vehicle and/or user related to the charging data set, the peer-to-peer application can at least initiate, preferably, conduct an accounting process on its own. For instance, user data (and/or vehicle data) of all members of all subsystems networked by the (roaming) peer-to-peer network can be stored in the peer-to-peer application and/or a storage arrangement controlled by the peer-to-peer application or the peer-to-peer application has access to user data (and/or vehicle data) stored in charging subsystems. Since the peer-to-peer application, in particular, the roaming controlling means may control and e.g. conduct the accounting process, a forwarding of charging data set(s) to the correct server(s) can be omitted. Further, due to the high security standards of the present peer-to-peer network, the security of stored user data can be further increased.

In a preferred embodiment of the present invention, a received charging data set may be only forwarded to the peer-to-peer application, if the gateway device detects that the charging data set is related to a user and/or electrical device, in particular, a vehicle which is not registered within the subsystem of the gateway. For instance, if the first gateway device assigned to a first subsystem detects that a received subsystem identifier indicates that the user and/or vehicle is associated with another subsystem than the first subsystem, the received charging data set (comprising said identifier) is forwarded to the peer-to-peer application by means of the first peer-to-peer module of the gateway device.

Preferably, the charging data set received from a charging station may comprise at least one subsystem identifier. This identifier is, in particular, the previously described subsystem identifier. The subsystem identifier may be the peer-to-peer identifier or included in the peer-to-peer identifier or an additional unique identifier assigned to a specific subsystem. The charging data set may be forwarded by a routing module of the gateway device to the peer-to-peer application e.g. via the peer-to-peer module or the charging data set may forwarded by the routing module of the gateway device to the server of the subsystem e.g. via at least one communication module of the gateway device. The routing of the charging data set may depend on the subsystem identifier. Since the gateway device may provide a routing function it is not necessary to transmit every received charging data set to both the at least on server and the peer-to-peer application.

It has been found that the roaming peer-to-peer network implemented for networking a plurality of charging subsystems can be additionally used for controlling the stability of the electrical grid. In particular, the flexibilities of the electrical vehicles can be used to stabilize the electrical grid. Generally, in an electrical grid the demand and supply of the electrical power should be (virtually) balanced. For instance, a grid operator can monitor the grid in order to manage the supply and demand of electrical power. According to an embodiment of the present roaming method, the method may further comprise:

providing at least one electrical grid status data set related to the current status of the grid to the peer-to-peer application, and controlling the exchange of electrical power between at least one charging station and at least one electrical vehicle by transmitting at least one set power data set from the peer-to-peer application to at least one gateway device e.g. via the peer-to-peer module, wherein the set power data set may be based on the provided electrical grid status data set.

The grid status data set may indicate e.g. that the electrical grid is (currently) overloaded or underloaded. Depending on the (current) grid status, the peer-to-peer application may control the exchange of electrical power. Alternatively or additionally, dynamic pricing points can be provided to indirectly control the exchange of electrical power. A dynamic pricing point may be set such that the e.g. the charging behavior of a user or electrical device may be influenced by incentivize the user or electrical device. For instance, charging or discharging actions can be interrupted or the charging or discharging current can be reduced (or increased) due to the current status of the grid by setting respective set values. According to a further example power consumption of a device or power generation of a device can be increased or decreased (e.g. fuel cell, power generator). Preferably, the peer-to-peer application can transmit at least one set power data set to at least one peer-to-peer module assigned to at least one gateway device. Preferably, all connected gateway devices can be provided with (e.g. different) set point data set depending on the (local) status of the grid. Local means the location of the charging station(s). A set power data set may comprise (maximum or minimum) current set value (s).

In a preferred embodiment a grid control device(s) and/or SCADA device(s) may be equipped with a peer-to-peer module configured to communicate with the peer-to-peer application. The respective device can directly interact with the peer-to-peer application e.g. by sending control data sets and/or pricing point data set to one or more (charging) sub-system(s) and/or to individual users and/or electrical devices. Dynamic pricing data provided by the grid operator can be an input for the charging sub-systems to provide pricing data to individual users and/or electrical devices, in particular, vehicles.

Furthermore, according to a further embodiment, the peer-to-peer application may comprise at least one registration means. More particularly, according to a preferred embodiment of the roaming method, the method may comprise:

receiving a registering message by a registration means of the peer-to-peer application from a peer-to-peer module assigned to a vehicle and/or a peer-to-peer module assigned to a user of the vehicle, wherein the vehicle and/or the user of the vehicle is registered in the peer-to-peer application by storing a peer-to-peer identifier of the vehicle and/or a peer-to-peer identifier of the user of the vehicle.

The registration means of the peer-to-peer application may be configured to receive a registering message of a peer-to-peer module. The registration means may be configured to register the user and/or vehicle by storing a unique (peer-to-peer) identifier. The peer-to-peer identifier can be stored in an identifier list. Preferably, the identifier list can be stored in the peer-to-peer application and/or a storage arrangement controlled by the peer-to-peer application. The identifier list can be used for the above descripted authorization process or forwarding process.

More particularly, an entity including a user, device, unit, vehicle or the like can be registered in the peer-to-peer application, as e.g. a so called smart asset. Each registered entity can be stored with its unique (peer-to-peer identifier) e.g. in one or more identifier list(s) of authorized entities. An identifier of an entity might be already a peer-to-peer identifier or another identifier suitable to uniquely identify the entity. The unique peer-to-peer identifier may be a serial number or a smart asset hash of e.g. the entity, the user's name of the entity, vehicle identification number, a communication address of an entity, a signature, etc. If e.g. an identifier of an entity is not already a unique peer-to-peer identifier, e.g. if the identifier is non-unique name of a user, the peer-to-peer application, in particular, the registering means, may be configured to generate a unique peer-to-peer identifier for the respective entity (according to preset rule (s)). It shall be understood that an electrical device can be an (autonomous) device.

It shall be understood that an entity can be an individual charging station registered in the peer-to-peer application. According to an embodiment of the roaming method according to the present invention, a charging station may connect (or register) itself to a charging sub-system via the peer-to-peer application. All users of a charging sub-system can interact with the individual charging station.

It shall be understood that an entity can be a user registered in the peer-to-peer application. Each registered user can be stored with or linked to its unique (peer-to-peer identifier) e.g. in one or more identifier list(s) of authorized entities. According to an embodiment of the roaming method according to the present invention, a user may authenticate himself at one of the devices in a charging system.

Prior to the registration of an entity (e.g. user, vehicle, gateway device, etc.), at least part of the nodes (peers) of the peer-to-peer network may check, in particular, by executing the registration means, whether the registering requirements (such as specific entity specifications or valid signatures or compliance requirements) predefined by the peer-to-peer network are met by the entity/device requesting registration. For instance, it may be necessary that a vehicle or gateway device meets predefined technical specifications. In order to perform the check, preferably, further data may be included in the registering message. In particular, the peers of the peer-to-peer network may provide registering rules or registering requirements which must be fulfilled by an entity to be regarded as a trustful entity. Rules/requirements may be individually defined by the peers of a peer-to-peer network. E.g. it may be necessary that a new entity must be recommended by an entity which is already a participant of the peer-to-peer network. In addition, it may be necessary that this participant must have a reputation factor which increases a predefined minimum reputation factor. For instance, if a user or provided of a subsystem has a low reputation factor e.g. due to detected non-payment of (some) invoice(s), the user or provider (and the corresponding gateway devices and peer-to-peer modules, respectively) may not be registered by the registration means.

According to a further preferred embodiment of the roaming method, the method may comprise:
  generating a roaming transaction agreement about at least one roaming process, and
  wherein the roaming process is controlled by the roaming controlling means at least based on the generated roaming transaction agreement.

The peer-to-peer application may be configured to store the generated roaming transaction agreement. A roaming transaction agreement may be a smart contract. In particular, the roaming controlling means may be at least a part of the roaming transaction agreement. The roaming process or action is in particular a process during which an electrical vehicle (or user of the vehicle) can use any charging station of a charging system comprising different subsystems networked by a peer-to-peer network. The roaming process may ensure that the supplier (or receiver) of the electrical power is adequately rewarded (or that that receiver adequately pays for the received power).

The roaming transaction agreement may be a general roaming transaction agreement between several providers of respective subsystems and/or a provider of the peer-to-peer network and its peer-to-peer application, respectively. The generation of the roaming transaction agreement can be caused or initiated by at least one peer-to-peer module, such as a peer-to-peer module of a subsystem provider, for example, by transmitting a request message comprising at least one instruction on the generation of the roaming transaction agreement. The request message may be sent by the peer-to-peer module in order to at least temporarily enable a roaming process.

In particular, a suitable code and, where necessary, at least one key (e.g. signature) for verifying the sender of a message (e.g. sending peer-to-peer module and/or assigned entity) and/or the authenticity of a message can be transmitted to the peer-to-peer application or written in the peer-to-peer application by the peer-to-peer module. The roaming transaction agreement may be generated between two or more entities, such as two provider entities of two different charging subsystems. Preferably following a confirmation message from the (other) provider entity comprising a suitable instruction and, where necessary, at least one key (e.g. signature) for verifying the sender of the confirmation message, a corresponding roaming transaction agreement can be advantageously generated following a check by the peer-to-peer network of the peer-to-peer application. Expressed in simple terms, each entity can search for one or a plurality of suitable partners by means of the peer-to-peer network or the peer-to-peer application and a roaming transaction agreement can be generated by means of the peer-to-peer application.

According to a preferred embodiment, the generated roaming transaction agreement may comprise technical details about the roaming process. In particular, a roaming transaction agreement may comprise at least one of:
  roaming criterion,
  identifiers of authorized gateway device(s) and/or of authorized charging station(s),
  at least one identifier(s) assigned to the first subsystem
  at least one further identifier assigned the further subsystem,
  registering rule(s),
  roaming algorithm(s), and
  grid control and/or dynamic pricing algorithms.

The roaming transaction agreement can be established between two subsystems in order to defined (technical) details of the roaming process. Preferably, roaming algorithms e.g. for an accounting action and/or a forwarding action (e.g. address data of one or more potential receiver (e.g. a specific gateway device and/or its peer-to-peer module); conditions to be fulfilled prior to forwarding; etc.) can be defined. Further registering rules to be fulfilled by users/ vehicles can be defined (e.g. minimum reputation factor, required technical details (capability to use specific communication protocols, etc.). Furthermore, the identifiers of all authorized gateways of the at least two subsystems and/or all authorized charging station(s) of the at least two subsystems may be stored in the roaming transaction agreement. Only these devices can be used by vehicles for charging/ discharging. Also the subsystem identifiers of the at least two subsystems can be stored in the roaming transaction agreement.

As previously described, it may be possible that in return to a conduction of a roaming action, the provider entity of the subsystem in which the user and/or vehicle is registered has to fulfill at least one generated roaming criterion prior to the roaming action and/or charging process, during the roaming action and/or charging process and/or after the roaming action and/or charging process. According to one embodiment, the peer-to-peer application may be configured to cause the conduction of an roaming criterion transaction based on at least one roaming criterion of the stored roaming transaction agreement, preferably, stored in the peer-to-peer application. For instance, the roaming criterion may be a financial value. Financial values can be (instantaneously) exchanged with a transaction via a cryptocurrency. Escrow functionality can be used to mitigate credit risk of transactions. In an alternative or additional embodiment micropayment channels may be used for a (constant) payment stream that can be handled e.g. partly off-chain to reduce the amount of on-chain transactions. In a further embodiment so called state channels or state networks (e.g. Raiden Network, Lightning Network) may be used to exchange digital tokens off-chain in a secure way. Opening and/or closing of state channels may be registered on the peer-to-peer application. This means that individual transactions may not be stored on the peer-to-peer application in order to improve scalability and avoid movement tracking of pseudonyms on the peer-to-peer application. In an embodiment advanced cryptographic methods may be used to enable anonymous transactions (e.g. zk Proof Systems, Ring Signatures, Mixers, HD Wallets). According to the present invention, a man-in-the-middle is not necessary. Fully automated processes from authentication to charging and billing can be provided.

It may be also possible that the provider of the roaming peer-to-peer network can get a reward e.g. for each conducted roaming action for providing the roaming peer-to-peer network from at least one of the evolved (providers of) subsystems.

According to a further preferred embodiment, the at least one peer-to-peer application can be a decentralized register, distributed ledger or a shared database configured to store data, e.g. roaming transaction agreement(s), identifier(s), set data set(s), etc., with given certain proofs or signatures. In addition to e.g. identifiers, the decentral register can store computer code acting as e.g. roaming controlling means for at least controlling a roaming action. In particular, the code can be invoked by a transaction to the address of the code in so called 'smart contracts'. This code can be processed on the plurality of node(s) of the peer-to-peer network.

It shall be understood that (smart contract) code or processing logic might be stored and executed in so called 'crypto conditions' of the Interledger protocol (ILP). This means that not necessarily all code must be stored in a smart contract such as Ethereum smart contract.

In a further embodiment the (smart contract) code might be stored and executed on a decentral computation market (e.g. Ethereum Computation Market, Trubit, Golem, Cryplets Microsoft).

In a further embodiment computer codes of an external computing device controlled by the peer-to-peer application may include algorithm(s) for de-central cognitive analytics, artificial intelligence or machine learning. Analytics and learning can be shared with other devices can be shared, aggregated and further analyzed via the peer-to-peer applications. For example these algorithms may be applied to adjust charging behavior to current grid conditions.

A decentralized register can be readable at least by a part of the participants of the peer-to-peer network. In particular, every computer node and each registered entity (by means of the respective peer-to-peer module) can comprise the peer-to-peer application. The decentralized register, at least the public part (i.e. may be without private contracts) may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application. A message or transaction sent to a smart contract may start the execution of a code of the smart contract (e.g. registration means, roaming controlling means, etc.) while using data stored in the smart contract. For instance, sending a charging data set to a roaming controlling means may start the execution of the code resulting in e.g. conducting an authentication process, a forwarding action and/or an accounting action, as described hereinbefore.

The peer-to-peer application might be built upon the following elements: peer-to-peer network comprising Consensus System/Protocol, Data Structure, Merkle Trees, Public Key Signatures and/or Byzantine Fault Tolerance. It may replicate data based on a consensus principle. It may be auditable and traceable.

In a simple way information can be made available to preferably all participants. This may allow to carry out a review of the information stored in the decentral register or the code executed in the decentral register. Particularly preferably, each computer (node) in the peer-to-peer network can be configured to review new information, in particular, based on older information stored in the peer-to-peer application. In addition, the at least one roaming controlling means may be monitored by at least a part of the nodes of the peer-to-peer network, preferably by all nodes. A manipulation of a roaming controlling means can thus be prevented, at least detected.

Moreover, at least a plurality of node, preferably each node can in each case comprise the complete data content, but include at least a portion of the data contents of the peer-to-peer application, in particular of the decentral register. For example, it may be provided that after a positive verification of written information or e.g. a positive registration in the peer-to-peer application this information is saved by all nodes, at least by a part of the computers. For instance, after the generation of a roaming transaction agreement and/or after a successful registration, the agreement and (new) identifier, respectively, can be stored at least by a part, preferably all nodes of the peer-to-peer network. The tamper resistance of the data stored in the peer-to-peer application can thereby be further improved. A roaming action or roaming criterion transaction can be securely controlled.

In order to store new information in a tamper-proof way, the peer-to-peer application can comprise encryption means and/or signature means and/or verification means, wherein at least one of the encryption means and/or signature means and/or verification means is configured to store data, such as a roaming transaction agreement (s), identifier(s), set data set(s), charging data set(s), etc. In particular, it can be provided that by the hash function a link is established with at least one previously stored information in the decentral register. Further data, such as request messages, ordinary, contextual and/or transaction data of an entity, such as a provider entity, can be stored.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the present system, the peer-to-peer application can be a block chain or decentral ledger comprising at least two blocks coupled to each other (e.g. Ethereum Block chain with Smart Contracts). The block chain technology or "decentral ledger technology" is already used in the payment by means of a crypto currency, such as Bitcoin. It has been recognized that by a particular configuration of a block chain, charging subsystems can be networked together and a roaming function can be provided in a secure way. E.g. a roaming controlling means can be easily implemented as a smart contract in a block chain. A charging system with two or more different subsystems of different providers can be managed in an easy manner.

In addition, the block chain can be used to generate predefined action(s) caused by at least one peer-to-peer module and/or a roaming controlling means in a tamper-proof manner. The block chain according to the present embodiment is particularly a decentralized, peer-to-peer-based register in which all data related to at least one roaming process can be logged. A block chain is particularly suitable as a technical means to replace a central entity/server in a simple and secure manner.

In further embodiments of the peer-to-peer application, the block chain can be a permissionless or permissioned block chain. In a specific case the block chain can be public, consortium or private block chain.

In a further embodiment, the peer-to-peer application can be formed by multiple block chains which are connected via mechanisms such as side chains or smart contracts. A peer-to-peer node can run one or more different block chain client (s).

Data of the peer-to-peer application can be stored on the "decentral ledger technology" and/or the decentral ledger steers (encrypted) data storage accessible via the internet and preferably in de-central data storage, object store and database, respectively, such as Interplanetary File System (IPFS) or storj or in a distributed Blockchain database (e.g. BigChainDB). Access to encrypted data to third party entities is managed via the permission means formed as one or more smart contract(s) on the block chain.

In addition, data feeds can be provided by the peer-to-peer application (so called "smart oracles"). Data feeds can provide further data relating to a charging and/or roaming action from at least one further source. For instance, further weather data and/or grid status data can be provided by a meteorological provider and/or a further grid status provider. Data can be captured from trusted sources off-chain and stored on the block chain or stored via the block chain on a decentral data storage entity.

Information among peer-nodes can be exchanged by a peer-to-peer messaging system. This means a peer node can send a message to another peer node to submit an information or to trigger an action. Messages can be clear text, signed, hashed, time-stamped and/or encrypted. This means that not all data exchanged among peer nodes must be stored on the block chain.

In a further embodiment, the at least one peer-to-peer network can be formed by a plurality of computer nodes and a peer-to-peer module, such as the first peer-to-peer module of a first gateway device, the second peer-to-peer module of a second gateway device, etc. A peer-to-peer module may be only configured to communicate with the plurality of computer nodes. In other words, the peer-to-peer module is not a computer node of the peer-to-peer network but only a participant. Such a peer-to-peer module does not comprise the peer-to-peer application but only provides an interface module, such as an application programming interface (API), and a decentral application for communication with the computer nodes of the peer-to-peer network or the peer-to-peer application, such as a block chain or a smart contract on the block chain. For instance, such a peer-to-peer module can either send clear text or encrypted information or generate a secure connection (e.g. tunnel) to a peer-to-peer gateway (or so called "remote node") in order to communicate with the peer-to-peer network. This allows reducing the required processing power of the peer-to-peer module.

In one implementation of the peer-to-peer network, there can be only one validating peer or full node, e.g. only one node can be configured to perform a validation process, e.g. conducting a roaming action, and one or more observing (or monitoring) nodes. An observing node can validate transactions to establish a trust level but does not validate all transactions which is done by the validating peer.

In a further embodiment, the peer-to-peer module is one of the nodes. In this case, the peer-to-peer module comprises at least a part of the peer-to-peer application. In particular, the peer-to-peer module can comprise preferably the total data content of the peer-to-peer application or can access the information stored in another node. For instance, the peer-to-peer module might be a so called "light node" or a decentral application (DAPP) connected to a remote node.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit data, such as charging data set(s), authentication result(s), grid status data set(s), to the peer-to-peer application via the API. The decentral application so called "Dapp" is at least configured to process and transmit said data.

Preferably, the data is signed or encrypted or can be transmitted via a cryptographically secured tunnel or a secured internet connection to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

Data and transactions stored on the block chain do not provide "transactional privacy". Transactions between pseudonyms may be (often) stored in clear text on the block chain. In some cases data stored on the block chain are encrypted and the keys may be handled via the block chain. Transactions between pseudonyms are stored in clear text on the block chain. Privacy preserving, secure transactions or execution of computer code can be achieved with cryptographic tools such as zero knowledge (zk) proofs or zk Succinct Non-interactive Arguments (zk-SNARK). Transactions or algorithms are separated into two parts: a smart contract on the block chain and a private contract. A privacy preserving protocol ensures the privacy of data and the correctness of code execution (SNARK verification is done via the smart contract on chain). The private contract computation can be done by a set of nodes, off-chain computers or done in measured launch environment or a secure hardware enclave for attestation and sealing that cannot be manipulated by other software code running on the devices. In an alternative embodiment secure Multi-Party-Computing (sMPC) systems can be used for transactional privacy. Examples for privacy preserving protocols and computation are HAWK and MIT Enigma.

With zero knowledge proof (zk Proofs) the parties can see that the algorithm is executed correctly in a private contract, but the input data are not disclosed to the party. In addition selective privacy can be achieved by sharing keys to decrypt transactions for reporting and auditing purposes.

To securely deploy code and or data into a device a trusted execution environment such as Intel SGX or TPM or Direct Anonymous Attestation module can be integrated with a peer-to-peer module.

Similarly, in a further embodiment a particularly large peer-to-peer network may be divided in two or more (physical or logical or dynamically virtual) clusters. In a corresponding peer-to-peer network, for example, a validation (of a subset of transactions) may only be carried out by the members of one cluster (a subset of nodes; e.g. sharding of a block chain to improve the scalability). In a further embodiment the peer-to-peer application can be formed using multiple block chains. These block chains are connected via frameworks such as sidechains or smart contracts or interledger protocol.

A further aspect of the present invention is charging system. The charging system may comprise at least two (charging) subsystems. The charging system comprises at least one peer-to-peer network comprising at least one peer-to-peer application. The charging system comprises a first subsystem with at least one first gateway device connected with at least one first charging station via a communication connection for receiving at least one charging data set from the first charging station. The charging system comprises at least one first peer-to-peer module assigned to the first gateway device and configured to communicate with the peer-to-peer application. The peer-to-peer application comprises a roaming control means executed by at least a part of the nodes of the peer-to-peer network and configured to control a roaming process based on the charging data set provided to the peer-to-peer application by means of the first peer-to-peer module.

The charging system may comprise at least one further subsystem comprising at least one further server, at least one further gateway device comprising at least one communication connection to the further server and at least one further charging station comprising at least one communication connection to the further gateway device, at least one further peer-to-peer module assigned to the further gateway device and configured to communicate with the peer-to-peer application.

It shall be understood the charging system can also comprise one subsystem connected with a peer-to-peer module to a peer-to-peer application and at least one user, vehicle or device that is registered in the peer-to-peer application.

The roaming method can be, in particular, used for a previously described charging system.

A further aspect of the invention is a gateway device assigned to a subsystem of a charging system, in particular, a previously described charging system. The gateway device comprises at least one communication module configured to receive at least one charging data set from at least one charging station. The gateway device comprises at least one peer-to-peer module configured to provide the charging data set to at least one peer-to-peer application such that a roaming process is controllable by a roaming control means executed by at least a part of the nodes of the peer-to-peer network based on the provided charging data set.

A still further aspect of the inventing is a peer-to-peer application of a peer-to-peer network. The peer-to-peer application comprises at least one roaming control means executable by at least a part of the nodes of the peer-to-peer network and configured to control a roaming process based on a charging data set provided by at least one peer-to-peer module assigned to a gateway device.

The features of the methods, systems, modules, peer-to-peer applications, gateway devices and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

DETAILED DESCRIPTION

Figure 1:
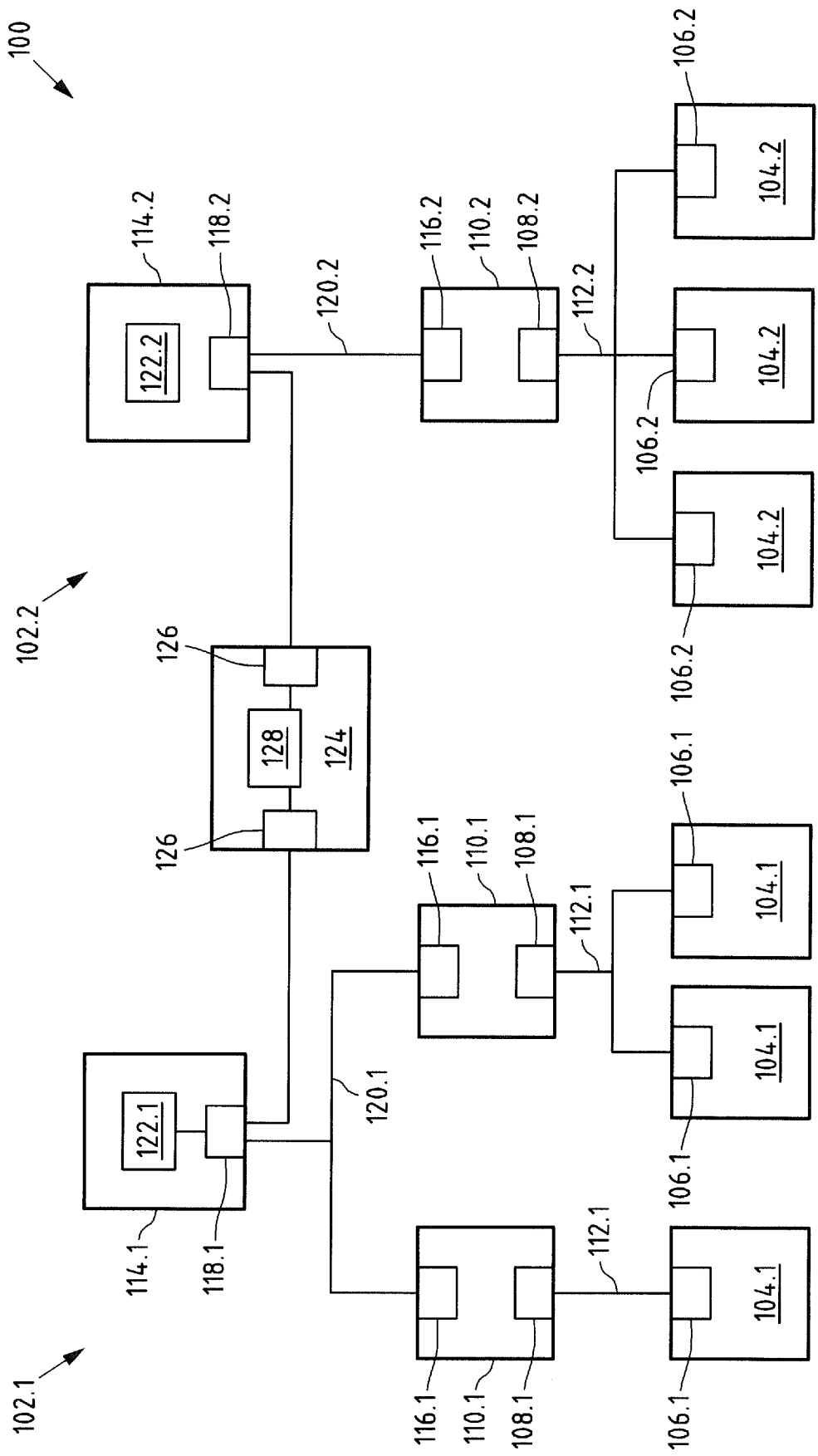
FIG. 1 shows a schematic view of an embodiment of a charging system according to prior art.

Like reference numerals in different figures indicate like elements. The subsequent embodiments may be related to the charging of electoral vehicles. However, the depicted embodiments can be easily transferred to an electrical inlet and/or outlet system configured to exchange electrical power between an electrical device and an electrical grid by means of a charging station.

Figure 2:
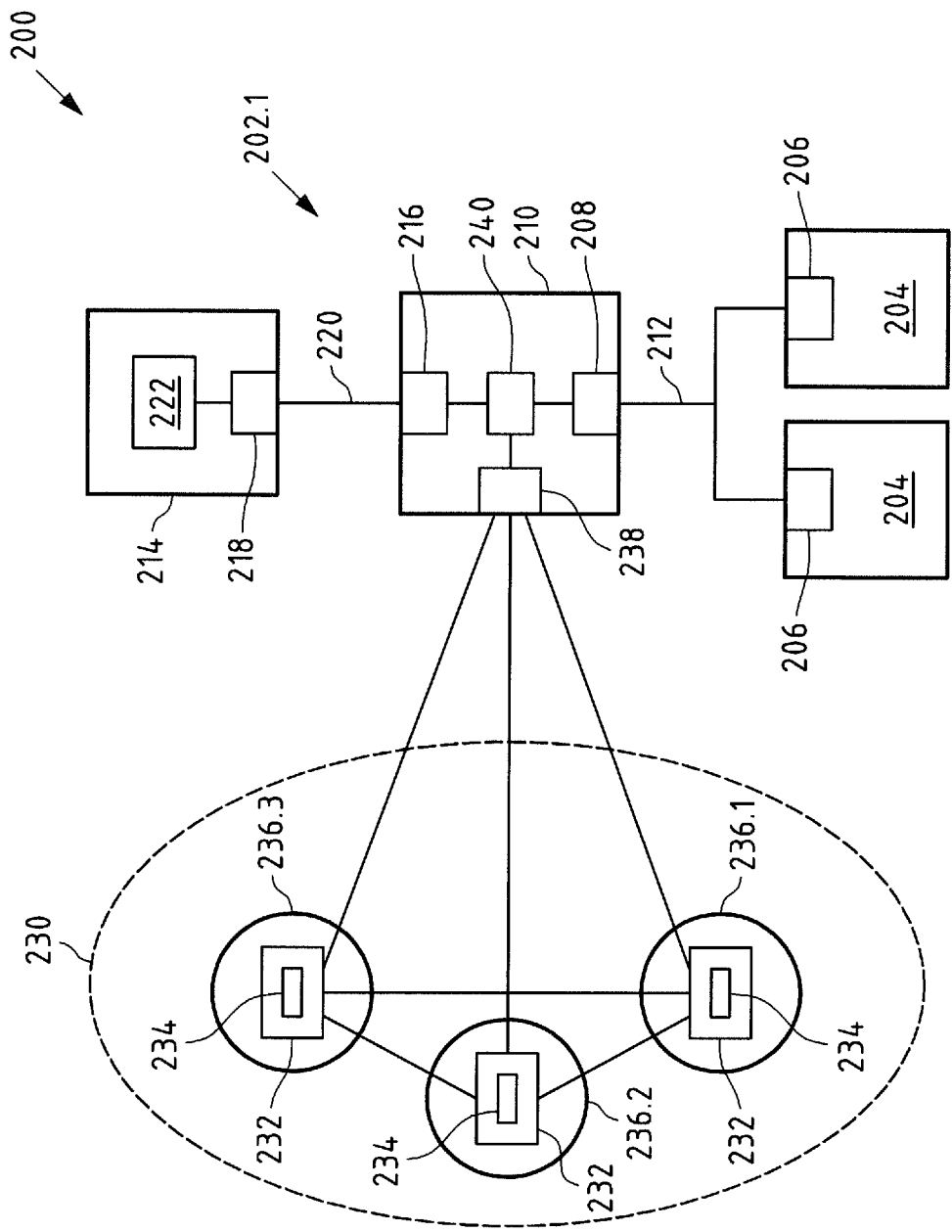
FIG. 2 shows a schematic view of an embodiment of an electrical inlet and/or outlet system, in particular, a charging system according to the present invention.

FIG. 2 shows a first embodiment of an electrical inlet and/or outlet system, in particular, a charging system according to the present application. The charging system 200 comprises a first charging subsystem 202.1. It shall be understood that the charging system 200 may comprise two or more subsystems.

The first subsystem 202.1 comprise at least one gateway device 210. By way of example, two charging stations 204 are connected with the gateway device 210 by a wired and/or wireless communication connection 212. For instance, each charging station can comprise a communication module 206 configured to establish a communication with a communication module 208 of the gateway device 210 via the communication connection 212.

The charging station 204 may be a conventional charging station 204. A charging station 204 may be connected with a (not shown) electrical grid. Each charging station 204 may comprise one or more means configured to establish an electrical connection with one or more (not shown) vehicles in order to charge e.g. a battery of the vehicle. In addition, a charging station may be configured to discharge a battery. In other words, a bidirectional power (or current) flow may be provided by a charging station.

Further, the charging station 204 may comprise a meter or the like to measure the power supplied or received to/from a vehicle. The charging station may be also configured to receive an identifier (e.g. peer-to-peer identifier) of the vehicle and/or user of the vehicle. For instance, the identifier can be received from the vehicle via the charging cable. Alternatively or additionally, the charging station may comprise a user interface or a nearfield interface configured to receive at least one identifier assigned to the user and/or vehicle.

The communication module 204 may be configured to transmit a charging data set to the gateway device 210. E.g. prior to starting a charging action, the charging station 204 may receive an identifier from the vehicle to be charged or a user of said vehicle. The received identifier can be forwarded in form of a charging data set to the gateway device 210.

The gateway device 210 may be connected with a first server 214 via a wired and/or wireless communication connection 220. For instance, between two communication modules 216, 218 a communication connection can be established via the communication connection 220. The first server 214 may comprise an accounting module 222 configured to process the received charging data set. For instance, based on the received charging data set comprising e.g. a user identifier (e.g. peer-to-peer identifier or another identifier) and the exchanged energy amount and a stored user data set comprising e.g. a user identifier and user account data, the accounting module may invoice the user for the charged energy amount. Invoicing can be done in fiat currency and/or a crypto token. The accounting system may comprise a (user, vehicle, charging station and/or device) ID registry.

Further, the depicted gateway device 210 comprises a routing module 240. The routing module 240 may be configured to route a charging data set received from one of the charging stations 204. Preferably, based on a received identifier assigned to a subsystem, the received charging data set may be forwarded to the first server or the peer-to-peer module. For instance, if the received subsystem identifier is assigned to the first subsystem 202.1 the received charging data set may be transmitted to the first server 214 for further processing (e.g. accounting or authenticating). If the received subsystem identifier is assigned to a further subsystem the received charging data set may be forwarded to the peer-to-peer module 238 in order to provide said data set to a peer-to-peer application 232. It shall be noted that according to other variants a routing module can be omitted. For instance, a charging data set can be always forwarded to both the peer-to-peer module and a connected server or only to the peer-to-peer module.

In the present embodiment, the peer-to-peer module 238 assigned to the gateway device 210 is integrated in the gateway device 238.

A substantial difference compared with prior art charging systems, such as charging system 100 according to FIG. 1, is that no central instance and/or third party organization is provided. In the present case, the charging system 200 comprises a peer-to-peer network 230 or a computer-computer network 230. The peer-to-peer network 230 comprises a plurality of nodes 236.1, 236.2, 236.3 and computers 236.1, 236.2, 236.3, respectively. A (roaming) peer-to-peer network 230 is characterized in the present case in that each node 236.1, 236.2, 236.3 and/or participant 238 is preferably connectable at least to every other node 236.1, 236.2, 236.3 and/or participant 230. For instance, at least one physical standard network (wired and/or wireless) can be used for connection. For communicating via the at least one physical standard network suitable transceiver modules may be arranged in the respective entities/devices.

In addition, the computers 236.1, 236.2, 236.3 have equal rights, something which distinguishes them from a server-client structure.

The depicted nodes 236.1, 236.2, 236.3 (each) comprise a peer-to-peer application 232. As can be seen from FIG. 2, the same peer-to-peer application 232 is preferably implemented on each node 236.1, 236.2, 236.3. This means, in particular, that the same content is comprised on each node 236.1, 236.2, 236.3 and that the same code can be executed on each node 236.1, 236.2, 236.3.

The peer-to-peer application 232 may preferably be a public register 232 or a decentral ledger 232 that can, in particular, be inspected by all participants 236.1, 236.2, 236.3, 238 (not only the nodes 236.1, 236.2, 236.3) of the peer-to-peer network 230. Each node 236.1, 236.2, 236.3 preferably has the (entire) public register 232. It may also be envisaged that only part of the register can be provided on a node (light node). In a particularly preferred embodiment, the peer-to-peer application 232 may be a block chain 232 which will be explained in more details hereinafter. It shall be understood that the peer-to-peer network may comprise further nodes. In addition, it shall be understood that also a gateway device can be formed as a node of the peer-to-peer network.

The peer-to-peer network 230 is configured to network two or more charging subsystems. The (roaming) peer-to-peer application 232 may be configured to manage and control a roaming process and roaming actions, respectively. In particular, the peer-to-peer application 232 may comprise a roaming controlling means 234. In particular, roaming actions related to a charging process of a vehicle at a charging station 204 is controlled by the peer-to-peer application 232 and the peer-to-peer network 230. In order to enable that a user or vehicle registered in another subsystem than the first subsystem 202.2 can use a charging station 204 of the first subsystem 202.1 the roaming controlling means 234 can control and/or conduct a roaming process e.g. including an authentication action and/or an accounting action and/or a forwarding action.

A peer-to-peer module 238 is (generally) configured to communicate at least with the peer-to-peer network 230, i.e. the nodes 236.1, 236.2, 236.3 of the peer-to-peer network 230. In other words, the first peer-to-peer module 238 or the gateway device 210 corresponding and/or assigned to the respective peer-to-peer module 238 is at least a participant of the peer-to-peer network 230. Preferably, all participants 236.1, 236.2, 236.3, 238 (including all nodes) of the peer-to-peer network 230 are known to each participant 236.1, 236.2, 236.3, 238 of the peer-to-peer network 230.

In the present case, the first peer-to-peer modules 238 is not a node of the peer-to-peer network 230 but only a participant 238. While nodes 236.1, 236.2, 236.3 or computers 236.1, 236.2, 236.3 in the peer-to-peer network 230 comprise at least a part of the peer-to-peer application 232 itself, a participant of a peer-to-peer network 230, like the present peer-to-peer module 238, does not comprise the peer-to-peer application 232. Such a peer-to-peer module 238 is configured to provide (only) access to the peer-to-peer application 232 e.g. via an API (application programming interface). Each peer-to-peer module 238 (also a node or light node) may comprise a decentral application and at least an API.

In the case, the peer-to-peer module is formed as a node of the peer-to-peer network the peer-to-peer module (also) comprises at least partly the peer-to-peer application 232. It shall be understood that a peer-to-peer module 238 might be a node of the peer-to-peer network. It shall be understood that a peer-to-peer module 238 may have access or may be connected to a "gateway" running a node of the peer-to-peer network.

The first peer-to-peer module 238 may comprise a communication connection to the routing module 240. The routing module 240, as explained above, may be configured to forward a charging data set to the peer-to-peer module 238 (e.g. based on a subsystem identifier).

The peer-to-peer module 238 may transmit, e.g. write, said charging data set to the peer-to-peer application 232. In particular, the roaming controlling means 234 may be configured to further process the received charging data set. Further, the first peer-to-peer module 238 may be configured to receive data, e.g. a charging data set or an authentication result, from the peer-to-peer application 232. For instance, the peer-to-peer module 238 may receive one or more message(s) and/or may be allowed to read out data intended for said peer-to-peer module 238 (e.g. due to a respective identifier). For instance, a charging data set received from the peer-to-peer application 232 can be forwarded from the first gateway device 210 to the first server 214 for further processing (e.g. authenticating or accounting).

The providing of the charging data set to a peer-to-peer module 238 may be caused or initiated by the roaming controlling means 234. The roaming controlling means 234 can be at least executed by a part (two or more) of the nodes 236.1, 236.2, 236.3 of the peer-to-peer network 230. Since at least a part (preferably, a plurality) of the nodes 236.1, 236.2, 236.3 is involved (and not only a single computer) a manipulation risk can be significantly reduced without needing a central instance, such as a server.

Figure 3:
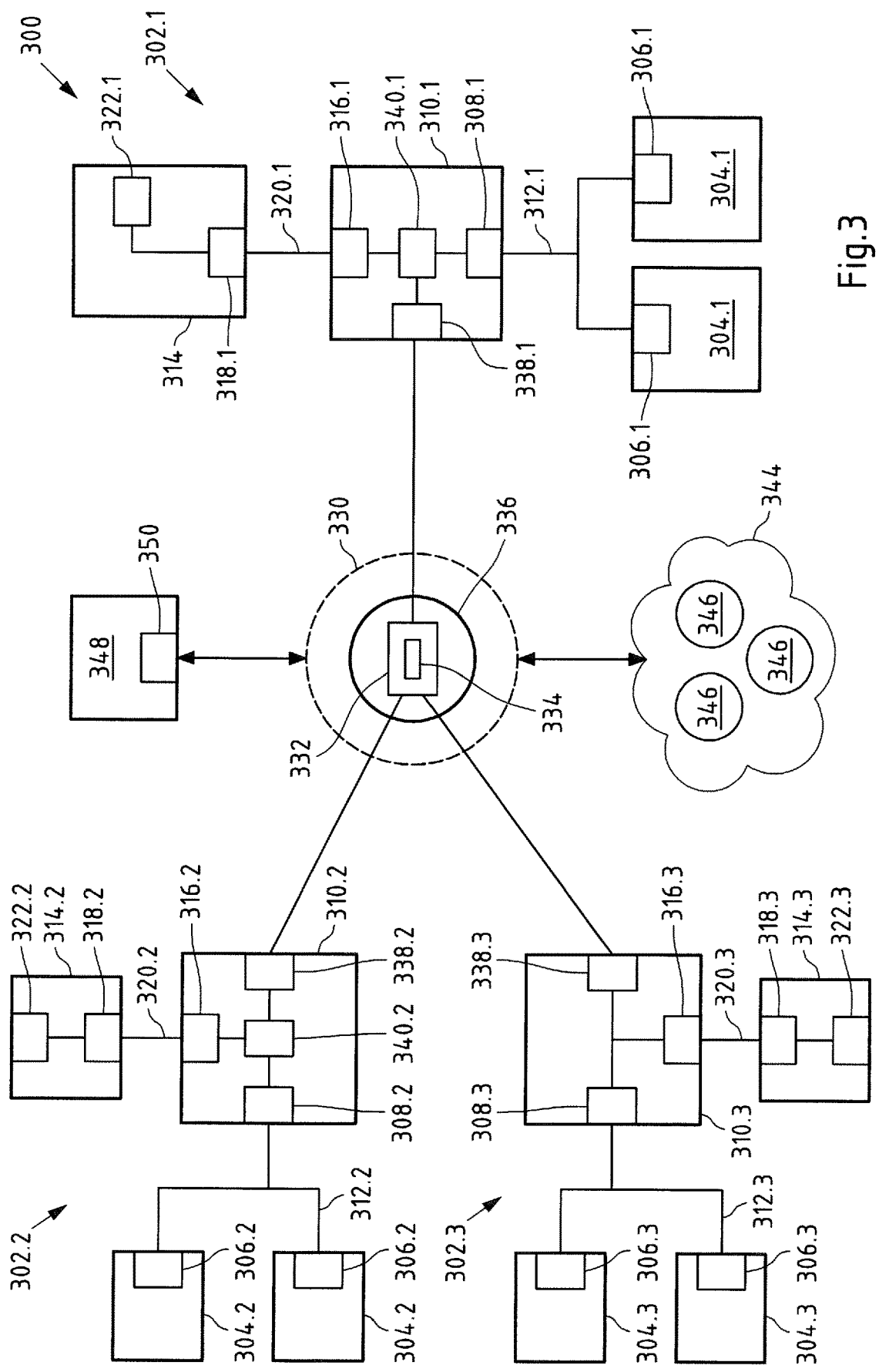
FIG. 3 shows a schematic view of a further embodiment of an electrical inlet and/or outlet system, in particular, a charging system according to the present invention.

FIG. 3 shows a schematic view of a further (more detailed) embodiment of a charging system 300 according to the present application. It shall be noted that mainly the differences between system 200 and system 300 will be explained.

As can be seen from FIG. 3, the depicted charging system 300 comprises three different charging subsystems 302.1, 302.2, 302.3 (e.g. of three different providers). E.g. subsystem may be at least partly a proprietary system e.g. comprising different authentication mechanism and/or accounting mechanism. In order to enable a user or vehicle registered only in a first subsystem 302.2 to use also charging stations 304.2 and/or charging stations 304.3 the depicted subsystems 302.1, 302.2, 302.3 are networked by a peer-to-peer network 330 providing a roaming opportunity by means of the peer-to-peer application 332. It is noted that for sake of clarity only one node 336 is depicted. It shall be understood that the peer-to-peer network 330 comprises a plurality of nodes.

Furthermore, a first peer-to-peer module 338.1 assigned to a first gateway device 310.1, a second peer-to-peer module 338.2 assigned to a second gateway device 310.2 and a third peer-to-peer module 338.3 assigned to a third gateway device 310.3 are provided. Each of the peer-to-peer modules 338.1, 338.2, 338.3 may be configured to communicate with the nodes 336 of the peer-to-peer network 330.

In addition, a storage arrangement 344 controlled by the peer-to-peer application 332 is provided. Data can be stored in the peer-to-peer application 332 and/or in a storage arrangement 344 controlled by the peer-to-peer application 332. Preferably, the storage arrangement 344 comprising a plurality of decentral storage units 346 may be formed as a decentral file system (such as IPFS) or a decentral object store (such as storj) or a decentral distributed database (such as BigchainDB) controlled by the peer-to-peer application 332. For instance, details about all registered entities can be stored in the storage arrangement 344. Further, according to other variants of the present invention, a (not shown) off-chain computing device controlled by the peer-to-peer application 332, e.g. the roaming controlling means 334, can be provided e.g. for conduction an accounting action or creating a charging control message or the like. Algorithms, cognitive analytics, machine learning and/or artificial intelligence can be operated in an off-chain or edge device to optimize the exchanging process, in particular, the charging process from a grid and/or a fleet perspective.

In an embodiment of the roaming system analysis of preferably all (to the peer-to-peer application known) charging transaction(s) and external data provided by a so called oracles (e.g. weather traffic conditions, etc.) to generate a charging demand forecast. This forecast can be exchanged with a grid control or SCADA device to improve operations of the underlying electrical grid system and/or generate control data sets or input for dynamic pricing algorithm(s). In a further embodiment the grid control or SCADA device may create this forecast by analyzing transactions in the peer-to-peer application.

In a fleet management system analysis the transaction(s) of vehicles belonging to a fleet in order to optimize the fleet and/or create control data set(s). Control data set(s) can be exchanged between roaming system, fleet management system and grid control/SCADA device to further optimize the grid and/or a fleet.

By way of example, an identifier list of all registered vehicles and/or users of devices, in particular, vehicles and/or charging station can be stored in the storage arrangement 344. During an authentication action (as will be described in more details hereinafter), a received peer-to-peer identifier can be compared by the peer-to-peer application 332 with the stored identifiers in the identifier list. If the peer-to-peer application 332 detects an identifier corresponding to the received peer-to-peer identifier a charging action and/or a further roaming action can be enabled. For instance, a release or lock message (depending on the authentication result) can be provided by the peer-to-peer application 332 to the corresponding gateway device 310, i.e. the gateway device 310 which has previously sent the charging data set to the peer-to-peer-application 332. Said gateway device 310 may forward the information to the charging station in order to release the supply (or receipt) of electrical power to (or from) a vehicle. In an embodiment said gateway device 310 can exchange message(s) with gateway device(s) of grid SCADA device(s), identity or vehicle fleet management systems.

In addition, a grid monitoring entity 348 may be provided. The grid monitoring entity 348 may be configured to monitor the electrical grid. For instance, grid parameters, such as a grid frequency, grid voltage and/or grid current can be monitored e.g. at one or more measuring locations at the grid. Based on the (continuously) measured one or more grid parameter(s) a grid status data set can be generated by the grid monitoring entity 348. There may be several grid status data set(s) for different grid location areas.

The grid status data set may be provided from a peer-to-peer module 350 assigned to the grid monitoring entity 348 to the peer-to-peer application 332. The peer-to-peer application may be configured to create set power data set(s) and may transmit one or more set power data set(s) to connected gateway devices 310.1, 310.2, 310.3. The one or more gateway device(s) 310.1, 310.2, 310.3 may forward a received set power data set to one or more connected charging station (e.g. also depending on the grid location area associated with the respective grid status data set). The charging station(s) may be configured to allow charging/discharging actions only within the power (and/or current limit(s)) set by the received set power data set. In an embodiment the controlling of charging/discharging actions may be based on dynamic pricing points and information, respectively.

It may be also possible that the grid monitoring entity 348 may be configured—eventually in accordance to terms defined in a smart contract—to generate the set power data set(s). In this case, the roaming peer-to-peer network and its peer-to-peer application may (only) forward the one or more set power data set(s) to the respective one or more gateway devices. It shall be understood that the roaming system may only comprise a peer-to-peer application including users, vehicles, charging stations and devices and a grid monitoring system.

Figure 4:
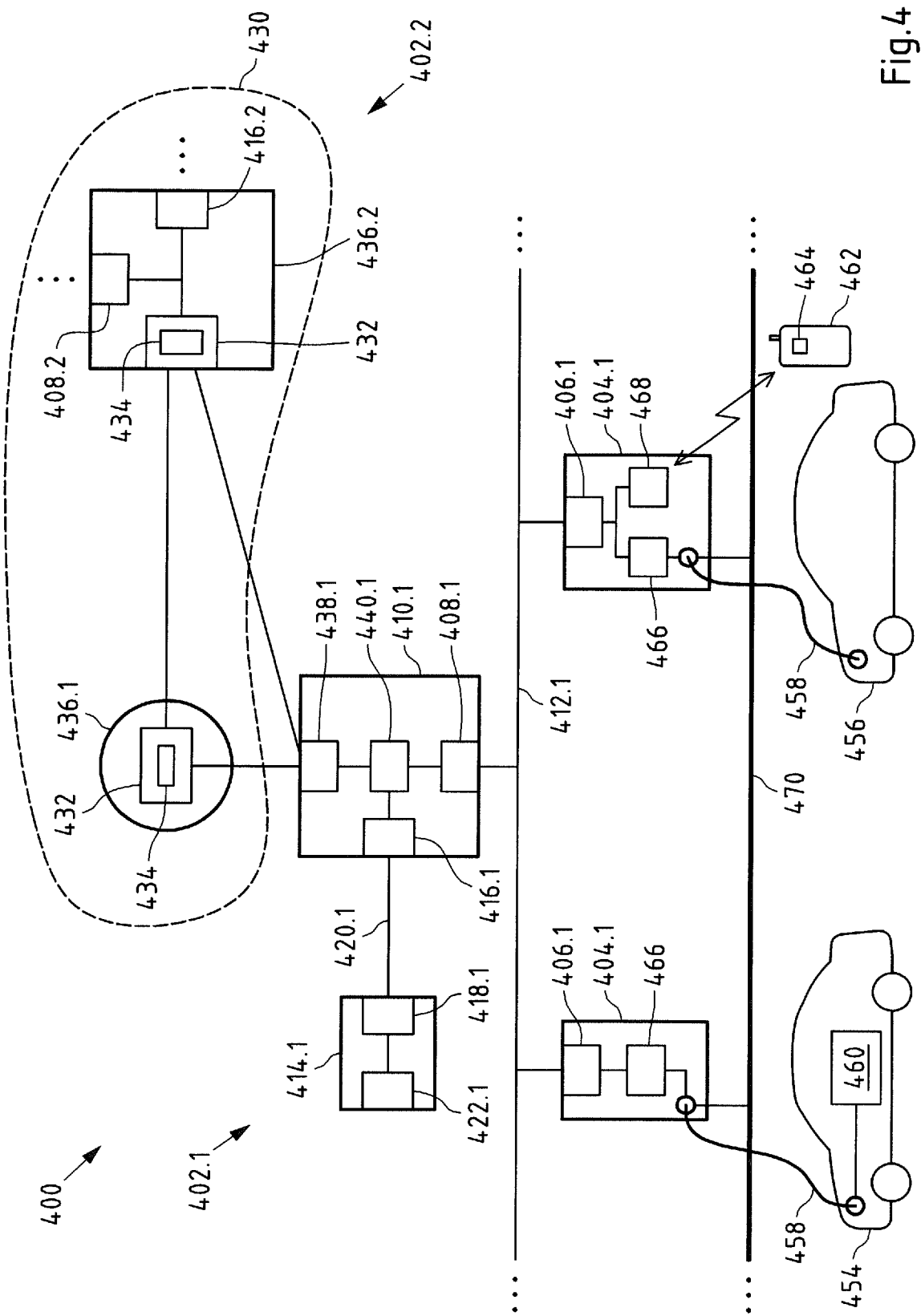
FIG. 4 shows a schematic view of a further embodiment of an electrical inlet and/or outlet system, in particular, a charging system according to the present invention.

FIG. 4 shows a further embodiment of a charging system according to the present invention. In order to avoid repetition, it is referred to the above described embodiments. In addition, the following is noted.

The two exemplified charging stations 404.1 are connected with the electrical grid. By closing a switch 466, an electrical connection between the electrical source (grid) of the charging station 404.1 and the vehicle 454, 456 via a charging cable 458 (or via an inductive charging connection) can be established. As described above, prior to closing the switch 466 for enabling charging/discharging an authentication action might be necessary. For instance, a (vehicle) identifier, in particular, in form of a peer-to-peer identifier can be transmitted from a storage unit 460 of the vehicle 454 via the charging cable 458 to the charging station 404.1. Alternatively, a (user) identifier in form of a peer-to-peer identifier can be transmitted to a nearfield interface 468 (e.g. Bluetooth, NFC, infrared or WLAN interface) from a storage unit 464 of a mobile terminal 462 (e.g. mobile phone, tablet computer, smart watch, etc.). In another embodiment the peer-to-peer identifier may be transmitted from a device inside a vehicle or is retrieved from the peer-to-peer application (e.g. ID or Wallet on Blockchain).

The charging station 404.1 may transmit a received peer-to-peer identifier to the roaming peer-to-peer network 430 via the gateway device 410.1. The roaming controlling means may e.g. conduct the authentication action based on the received peer-to-peer identifier and stored authorized peer-to-peer identifiers. The authentication result can be transmitted to the respective charging station 404.1 via the gateway device. Based on the received authentication result (positive or negative) the switch 466 may be closed (positive result) or not (negative result).

Furthermore, as can be seen from FIG. 4, a further gateway device 410.2 of a further subsystem 402.2 may be also a node 436.2 of the peer-to-peer network 430. For instance, the gateway device 410.2 may have one or more powerful processors. In this case, the processing power provided can also be used by the peer-to-peer application 432, e.g. the roaming controlling means 434.

Figure 5:
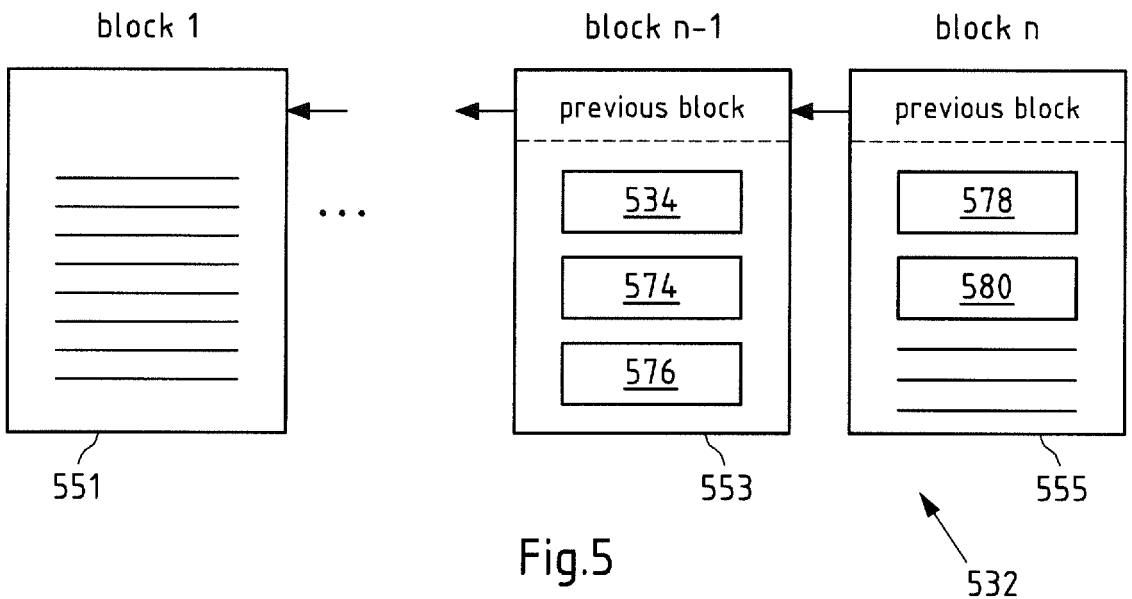
FIG. 5 shows a schematic view of an embodiment of a peer-to-peer application according to the present invention.

FIG. 5 shows a schematic view of an embodiment of a peer-to-peer application 532 according to the present invention.

The depicted peer-to-peer application 532 is a register or distributed ledger readable, in particular, by the participants of the peer-to-peer network. Thereby, data set(s) e.g. in form of messages can be written and/or read into/from the register 532 by a peer-to-peer module assigned to a gateway device and/or any other participants in the peer-to-peer network. In a preferred embodiment, the peer-to-peer application 532 may be a block chain 532.

Hereinafter, it is assumed in the following description of the present embodiment that the at least one peer-to-peer application 532 is a block chain 532. However, the following remarks can be easily transferred to other peer-to-peer applications, such as a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In further embodiments of the peer-to-peer application the block chain can be a permissionless or permissioned block chain. In a specific case the block chain can be public, consortium or private block chain.

In a further embodiment, the peer-to-peer application can be formed with multiple block chains which are connected via mechanisms such as side chains or smart contracts. Interoperability among block chains can be established.

The block chain 532 is formed by at least one block 551, 553, 555, preferably by a plurality of interconnected blocks 551, 553, 555. The first block 451 may also be called genesis block 551. As can be seen, a block 553, 555 (except for the first block 551) refers to each previous block 551, 553. A new block can be created by a computationally intensive process (for example, so called "mining" or through another appropriate process, such as voting) and will be particularly provided to all participants of the peer-to-peer network. In a further embodiment a (centrally controlled) master or a set of master nodes node may be configured to create new blocks and/or validating transactions. All other nodes can be validation nodes only.

The present block chain 532 is particularly adapted to receive messages, such as messages comprising charging data set(s) and/or set data set(s), registering data, authentication result(s), etc., from a peer-to-peer module of a previously described gateway device, (off-chain) computing entity or from another peer-to-peer device/unit of another participant of the peer-to-peer network. Further, the block chain 532 is particularly adapted to save these messages in the block chain 532. Furthermore, the block chain 532 is configured to generate messages e.g. based on an roaming process/action, an authentication or authorization process and/or caused by a peer-to-peer module and/or the execution of code of e.g. a roaming controlling means 534. In particular, the block chain 532 is at least configured to control and manage an inlet and/or outlet system, such as shown in FIG. 2, 3 or 4.

In particular, a (newly) received message can be saved and published in the current block 555 of the block chain 532. Due to the configuration of a block chain 532 as a public register 532, said data message of e.g. a peer-to-peer module can be read by preferably all participants of the peer-to-peer network. Alternatively or additionally, data of a message may be stored on a decentral file service or distributed block chain database controlled by the block chain 532.

As already described, in the present block chain 532 different types of messages and data sets, respectively, for example, within a smart contract (algorithm and/or storage at the block chain 532) can be processed and/or stored. In the present example, the block chain 532 comprises a roaming controlling means 534 in form of a smart contract 534. As previously described the roaming controlling means may be configured to at least control at least one roaming process comprising authentication action(s), forwarding action(s) and/or accounting action(s).

Furthermore, in the block chain 532 one or more roaming transaction agreement(s) 574 may be stored. A roaming transaction agreement 574 may be generated between two (or more) subsystems in order to define the details of roaming process(es). An example of a generation of such a roaming transaction agreement 574 will be described in the following:

A roaming transaction agreement 574 may comprise at least one of the following data:
Identifier(s): One or more identifier(s) of the involved entities, such as subsystem identifiers of the subsystems, identifiers of the charging station(s), gateway device(s), etc.
Roaming transaction criterion: Criterion that must be fulfilled for conducting a roaming process
Roaming detail(s): Detail(s) about roaming process(es) (e.g. roaming algorithm(s), registering rule(s)

The roaming transaction criterion may be e.g. an amount of cryptocurrency e.g. per charging action or charged/discharged energy amount which has to be transferred prior to, during and/or after the roaming action(s). Preferably, at least a part of the agreed amount of cryptocurrency can be locked by the peer-to-peer application 532 prior to a roaming action. In an embodiment the roaming transaction criterion may be a payment channel for streaming small amounts of crypto tokens per each time and/or data unit. It shall be understood that other transaction criteria and further information can be included in an roaming transaction agreement. More information/criteria can be, for example, a time stamp, an ID of the transaction and the like.

In order to generate a roaming transaction agreement 574, a peer-to-peer module of a provider entity of a first subsystem and a peer-to-peer module of a provider entity of a further subsystem can exchange roaming request and response (acceptance) messages via the peer-to-peer application 574. A request message may comprise indications about the above data (identifications, transaction criteria).

For instance, a provider entity of a first subsystem can send by a peer-to-peer module a (offer) message 576 to the peer-to-peer application 532 comprising data, such as an identifier assigned to the provider, available gateway devices and/or charging stations, geographic coordinates of the charging stations, identifier(s) of the charging stations, roaming algorithm(s) and/or at least one roaming transaction criterion.

Another message 578 may be an acceptance message 578 of e.g. one or more further provider entities. An acceptance message 578 may comprise identical or at least similar data details as compared with a (offer) message 576. Additionally, the acceptance message 578 can comprise a reference indication to a previous message, such as the ID of the message 576. The acceptance message 578 can be provided by a further peer-to-peer module of a provider entity or by the peer-to-peer application (e.g. according to preset rules).

If, for example, the acceptance message 578 comprises a higher or other transaction criterion and/or other desired roaming algorithms, the acceptance/request message 578 can be called a counter-offer message. This can be accepted by the peer-to-peer module of the first provider entity through an acceptance message. Based on this a peer-to-peer module of an entity may cause the generation of a roaming transaction agreement 574 about one or more roaming process(es). For instance, the roaming transaction agreement 574 can be used for every roaming process in which charging stations and/or gateway devices of the respective subsystems are involved.

In particular, there can be multiple offer messages and/or request/accepting messages and/or messages. Each entity can give guidelines, according to which at least one roaming transaction agreement 574 or other agreements can be generated. In a preferably automated, such as iterative process, each request/offer message can be associated to an optimally corresponding acceptance message. The block chain 532 may be configured to generate, based on the messages of a peer-to-peer module, an roaming transaction agreement 574.

Further, the roaming controlling means 534 may be configured to control at least one roaming action (and/or user) based on the one or more roaming transaction agreement(s) 574. The roaming controlling means 534 may be executed by at least part of the nodes of the peer-to-peer network for conducting a roaming action. For instance, based on a received peer-to-peer identifier and stored peer-to-peer identifiers of authorized users and/or vehicles, the peer-to-peer application 532, in particular, the roaming controlling means 534 may allow the conduction of a charging action. Only in the case the received identifier corresponds to one of the stored identifier, a positive authentication result can be transmitted to the respective charging for releasing the power flow between charging station and vehicle.

Moreover, a block chain 534 may comprise a registration means 580 configured to register a (new) gateway device, charging station, vehicle, user, electrical device, fleet management system, central identification device, payment gateway, SCADA and/or grid control device, etc. in the block chain 534 as a smart asset or an individual user.

Figure 6:
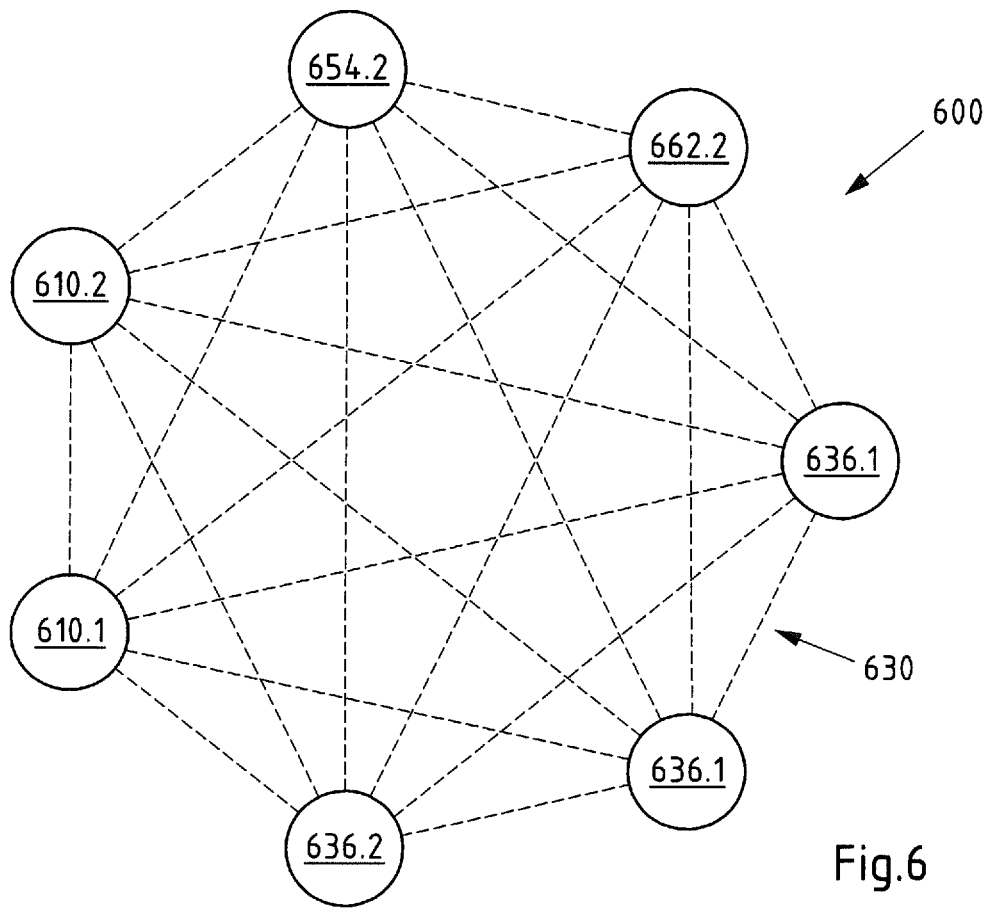
FIG. 6 shows a schematic view of a further embodiment of an electrical inlet and/or outlet system, in particular, a charging system according to the present invention.

FIG. 6 shows a schematic view of another embodiment of a charging system 600 of the invention. In the present embodiment only nodes and participants 610.1, 610.2, 636.1, 636.2, 654.2, 662.2 of the peer-to-peer network 630 are shown. In the present example, it is assumed that all nodes participants 610.1, 610.2, 636.1, 636.2, 654.2, 662.2 comprise the peer-to-peer application (not shown).

The nodes 610.1, 610.2 may correspond to gateway devices and e.g. be formed by the respective peer-to-peer modules of gateway devices. The node 654.2 may be a vehicle realized by a peer-to-peer module of a vehicle, and 662.2 may be a mobile terminal. Nodes 636.1 and 636.2 may be other nodes. It shall be understood that nodes can be full, remote or light nodes. In further embodiments the nodes can comprise a central ID device with a peer-to-peer module, a SCADA or grid control device with a peer-to-peer module, a vehicle fleet management system and/or a payment gateway with ID registry, customer account management and/or a fiat/crypto token exchange service.

As can be seen, two different types of peers or node computers 610.1, 610.2, 636.1, 636.2, 654.2, 662.2 are presently illustrated. All peers 610.1, 610.2, 636.1, 636.2, 654.2, 662.2 are comprised by the peer-to-peer network 630. In the present embodiment, however, only a part of the peers 610.1, 610.2, 636.1, 636.2, 654.2, 662.2 in the present case, the peers (nodes) 610.1, 636.1, check the validity of e.g. a roaming process, e.g. an authentication action, a forwarding action, accounting action and/or further data stored in the peer-to-peer application messages, such as agreements, instructions data set messages, and the like.

Furthermore, only a part of the entire peers can be configured to store the peer-to-peer application and/or only a part of the peers can be configured to execute the algorithms of a smart/private contract. Since the validation/verification of e.g. identification data requires a considerable computational effort, it may be advantageous for reasons of efficiency, if only a part of the peers 610.1, 636.1, especially particularly powerful peers 610.1, 636.1, perform the validation and/or roaming controlling algorithms.

Validation, analytics and optimization can be done on-chain or off-chain, as described hereinbefore. Off-chain validation and/or optimization can be managed by the peer-to-peer application, like the code on the block chain. Powerful means in particular a high computing power. In other words, in the present case a valid entry in the peer-to-peer application, such as a block chain, is assumed if (only) a part of the peers 610.1, 636.1 comes to a positive result. It shall be understood that only a single, especially particularly powerful peer can perform the validation, analytics and/or optimization process.

Similarly, in an alternative (not shown) embodiment, a particularly large peer-to-peer network may be divided in two or more clusters. In a corresponding peer-to-peer network, for example, a validation will only be carried out by the members of one cluster (e.g. sharding of a block chain to improve the scalability). In a further embodiment the peer-to-peer application can be formed using multiple block chains. These block chains are connected via frameworks such as sidechains or smart contracts or interlegder.

Figure 7:
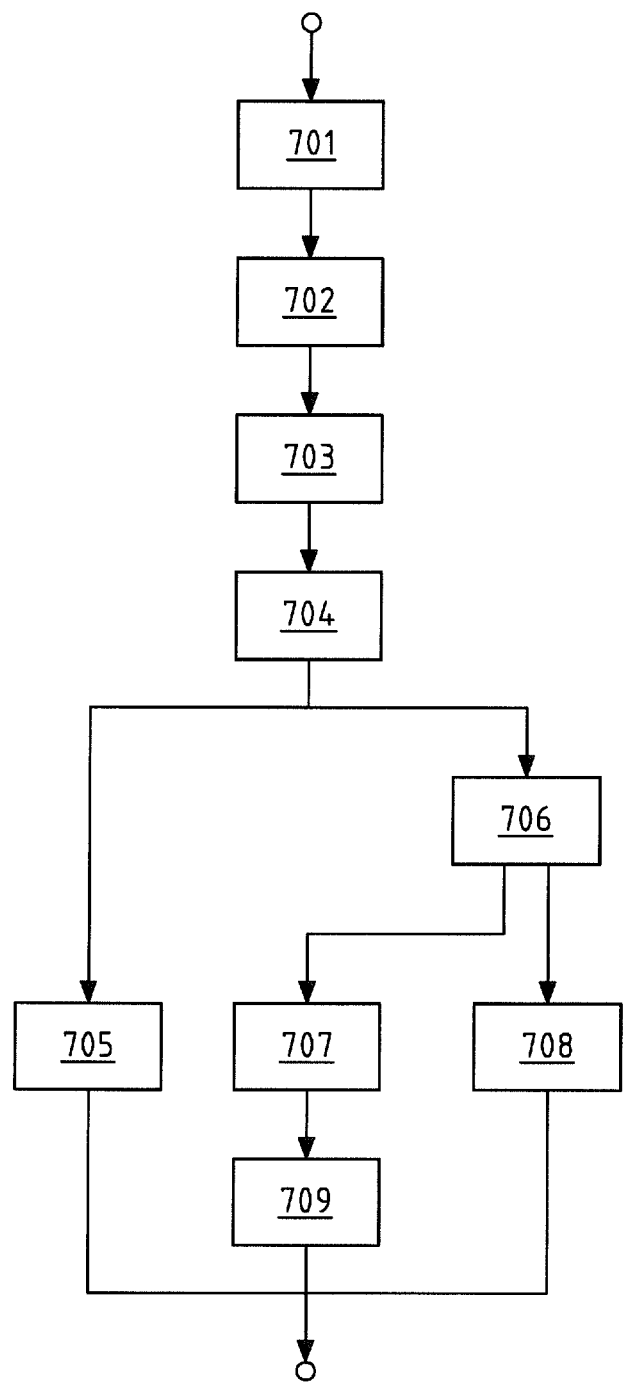
FIG. 7 shows a diagram of an embodiment of a method according to the present invention.

FIG. 7 shows an embodiment of a roaming method according to the present invention. The method can be used for operating a previously described charging system.

In a first step 701, a first roaming action in form of an authentication action can be at least controlled by roaming controlling means. For instance, a received charging data set can comprise a peer-to-peer identifier of a vehicle (or user) which desires to conduct a charging action. The received peer-to-peer identifier can be compared with stored authorized peer-to-peer identifiers of a list (by means of the roaming controlling means). Only if a match can be found the authentication result is positive. Alternatively or additionally the authentication step can check whether an escrow payment is done or a real-time payment streaming connection (payment channel) is established. The authentication result can be transmitted from the peer-to-peer application via the respective gateway device and the respective charging station.

In a next step 702, upon a positive authentication result the charging/discharging action can be conducted. For instance, a current can flow from the charging station to the vehicle and its battery for a specific time period. In case of a payment channel the decentral application (DAPP) of a charging entity may check whether the payment stream is continuing in accordance to the charged energy. In case the payment stream is interrupted the transfer of energy will be interrupted or reduced accordingly.

After the charging action has been finished, a charging data set can be transmitted from the charging station to the gateway device. For instance, the charging station may transmit a charging data set comprising a subsystem identifier and charging amount information, e.g. the power supplied to the vehicle during the charging action.

Based on the subsystem identifier, a routing module of the gateway device may forward the received charging data set in step 704. For instance, if the received subsystem identifier is assigned to the subsystem of said gateway device the gateway device may forward the charging data set to the connected server e.g. for accounting the charging amount information (step 705). If the received identifier indicates another subsystem the charging data set may be forwarded to the peer-to-peer application by means of the peer-to-peer module assigned to the gateway device.

In step 706, the peer-to-peer application, in particular, the roaming controlling means, check, in particular, based on roaming algorithm(s) of a roaming transaction agreement whether the received charging data set should be forwarded (step 707), and if, to which further gateway device, or whether an accounting action should be conducted by the peer-to-peer application (step 708). The further gateway device may forward the received charging data set to the connected further server in step 707. Then, the further server may process the charging data set, e.g. may conduct an accounting action (step 709).

In each accounting step 705, 708, 709, the respective accounting means may conduct the accounting action based on stored user data (including accounting data) and the received charging amount information and a peer-to-peer identifier (for assigning the received charging amount information to the correct user data).

It shall be noted that the method can comprise further steps, such a registering step, roaming criterion transaction step, generation step of a roaming transaction agreement, etc. Further, it shall be understood that at least some of the steps can also be conducted at least partly in parallel. For instance, a charging action can be started prior to receiving an authentication result. Then, in dependence on the received authentication result, the charging action can be prosecuted or interrupted/stopped.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A roaming method for a charging system with at least two charging subsystems, wherein each of the at least two charging subsystems comprises a gateway device connectable to at least one charging station, wherein the at least two charging subsystems differ from each other in the used authentication process and/or the accounting process wherein the at least two charging subsystems are networked by at least one peer-to-peer network, the method comprising:
   receiving a charging data set through a communication module of a gateway device from a charging station assigned to the gateway device,
   forwarding the charging data set by a peer-to-peer module assigned to the gateway device to a peer-to-peer application of the peer-to-peer network, and
   controlling at least part of a roaming process by a roaming controlling means of the peer-to-peer application executed by at least two of the nodes of the peer-to-peer network based on the received charging data set,
   wherein the charging data set comprises at least one peer-to-peer identifier assigned to a user of a vehicle to be charged or discharged and/or a vehicle to be charged or discharged of a user,
   wherein controlling a roaming process comprises at least initiating an authentication action, wherein the authentication action comprises evaluating the validity of the peer-to-peer identifier, based on the peer-to-peer identifier,
   wherein the peer-to-peer application is a decentralized register or a shared database, and
   wherein data is stored by the peer-to-peer application with given proofs or signatures.

2. The roaming method according to claim 1, wherein a charging action is only released upon a provision of a positive authentication result by the peer-to-peer application to the charging station via the gateway device.

3. The roaming method according to claim 1, wherein
   the charging data set comprises at least one charging subsystem identifier,
   wherein controlling a roaming process comprises at least initiating a forwarding action for forwarding the charging data set to at least one further peer-to-peer module assigned to at least one further gateway device of a further charging subsystem based on at least the subsystem identifier.

4. The roaming method according to claim 3, wherein the received charging data set is forwarded by the further gateway device to a further server for further processing the charging data set.

5. The roaming method according to claim 1, wherein
   the charging data set comprises at least one peer-to-peer identifier assigned to a user of an electrical device, in particular, a vehicle and/or an electrical device, in particular, a vehicle of a user and at least one charging amount information,
   wherein controlling a roaming process comprises at least controlling an accounting process for the charging process related to the charging data set based on at least the charging amount information and the peer-to-peer identifier.

6. The roaming method according to claim 1, wherein
   the charging data set received from a charging station comprises at least one subsystem identifier,
   wherein the charging data set is forwarded by a routing module of the gateway device to the peer-to-peer application or to a server depending on the subsystem identifier.

7. The roaming method according to claim 1, wherein the method comprises:
   providing at least one electrical grid status data set related to the current status of the electrical grid to the peer-to-peer application,
   wherein the grid status data set indicates that the electrical grid is currently overloaded or underloaded, and
   controlling the exchange of electrical power between at least one charging station and at least one electrical vehicle by transmitting at least one set power data set from the peer-to-peer application to at least one gateway device,
   wherein the set power data set is based on the provided electrical grid status data set.

8. The roaming method according to claim 1, wherein the method comprises:
   receiving a registering message by a registration means of the peer-to-peer application from a peer-to-peer module assigned to an electrical vehicle and/or a peer-to-peer module assigned to a user of the electrical vehicle,
   wherein the electrical vehicle and/or the user of the electrical vehicle is registered in the peer-to-peer application by storing a peer-to-peer identifier of the electrical vehicle and/or a user of the electrical vehicle.

9. The roaming method according to claim 1, wherein the method comprises:
   generating a roaming transaction agreement about at least one roaming process, wherein the roaming transaction agreement comprises at least one of:
   roaming criterion,
   identifiers of authorized gateway device(s) and/or of authorized charging station(s),
   at least one identifier(s) assigned to the first charging subsystem,
   at least one further identifier assigned the further charging subsystem, registering rule(s),
roaming algorithm(s), and
grid control and/or dynamic pricing algorithms,
wherein the at least one roaming process is controlled by the roaming controlling means at least based on the generated roaming transaction agreement.

10. The roaming method according to claim 9, wherein the method comprises conducting at least one roaming criterion transaction at least controlled by the roaming controlling means based on at least one roaming criterion of the generated roaming transaction agreement, wherein financial values in accordance with the roaming criterion are exchanged with a roaming criterion transaction via a cryptocurrency.

11. The roaming method according to claim 1, characterized in that the at least one peer-to-peer application is a block chain or decentral ledger comprising at least two blocks coupled to each other.

12. The roaming method according to claim 1, wherein the peer-to-peer network comprises only one validating node configured to perform a validation process one or more observing nodes configured to validate transactions to establish a trust level.

13. A charging system, comprising:
at least one peer-to-peer network comprising at least one peer-to-peer application;
a first charging subsystem with at least one first gateway device connected with at least one first charging station via a communication connection for receiving at least one charging data set from the first charging station,
at least one first peer-to-peer module assigned to the first gateway device and configured to communicate with the peer-to-peer application,
wherein the peer-to-peer application comprises a roaming controlling means executed by at least two of the nodes of the peer-to-peer network and configured to control a roaming process based on the charging data set provided to the peer-to-peer application by means of the first peer-to-peer module,
wherein the charging data set comprises at least one peer-to-peer identifier assigned to a user of a vehicle to be charged or discharged and/or a vehicle to be charged or discharged of a user,
wherein controlling a roaming process comprises at least initiating an authentication action, wherein the authentication action comprises evaluating the validity of the peer-to-peer identifier, based on the peer-to-peer identifier,
wherein the peer-to-peer application is a decentralized register or a shared database, and
wherein data is stored by the peer-to-peer application with given proofs or signatures.

14. A gateway device assigned to a charging subsystem of a charging system, in particular, a charging system according to claim 13, comprising:
at least one communication module configured to receive at least one charging data set from at least one charging station,
at least one peer-to-peer module configured to provide the charging data set to at least one peer-to-peer application such that a roaming process is controllable by a roaming controlling means executed by at least two of the nodes of the peer-to-peer network based on the provided charging data set, wherein the charging data set comprises at least one peer-to-peer identifier assigned to a user of a vehicle to be charged or discharged and/or a vehicle to be charged or discharged of a user, and
wherein controlling a roaming process comprises at least initiating an authentication action, wherein the authentication action comprises evaluating the validity of the peer-to-peer identifier, based on at least the peer-to-peer identifier,
wherein the peer-to-peer application is a decentralized register or a shared database, and
wherein data is stored by the peer-to-peer application with given proofs or signatures.

15. A peer-to-peer application of a peer-to-peer network, the peer-to-peer application comprising:
at least one roaming controlling means executable by at least two of the nodes of the peer-to-peer network and configured to control a roaming process based on a charging data set provided by at least one peer-to-peer module assigned to a gateway device,
wherein the charging data set comprises at least one peer-to-peer identifier assigned to a user of a vehicle to be charged or discharged and/or a vehicle to be charged or discharged of a user,
wherein controlling a roaming process comprises at least initiating an authentication action, wherein the authentication action comprises evaluating the validity of the peer-to-peer identifier, based on the peer-to-peer identifier,
wherein the peer-to-peer application is a decentralized register or a shared database, and
wherein data is stored by the peer-to-peer application with given proofs or signatures.

16. A roaming method for a charging system with at least two charging subsystems, wherein each of the at least two charging subsystems comprises a gateway device connectable to at least one charging station, wherein the at least two charging subsystems differ from each other in the used authentication process and/or the accounting process wherein the at least two charging subsystems are networked by at least one peer-to-peer network, the method comprising:
receiving a charging data set through a communication module of a gateway device from a charging station assigned to the gateway device,
forwarding the charging data set by a peer-to-peer module assigned to the gateway device to a peer-to-peer application of the peer-to-peer network, and
controlling at least part of a roaming process by a roaming controlling means of the peer-to-peer application executed by at least two of the nodes of the peer-to-peer network based on the received charging data set,
wherein the charging data set comprises at least one peer-to-peer identifier assigned to a user of a vehicle to be charged or discharged and/or a vehicle to be charged or discharged of a user,
wherein controlling a roaming process comprises at least initiating an authentication action, wherein the authentication action comprises evaluating the validity of the peer-to-peer identifier, based on the peer-to-peer identifier, and
wherein the at least one peer-to-peer application is a block chain or decentral ledger comprising at least two blocks coupled to each other.

17. A charging system, comprising:
at least one peer-to-peer network comprising at least one peer-to-peer application;
a first charging subsystem with at least one first gateway device connected with at least one first charging station via a communication connection for receiving at least one charging data set from the first charging station, at least one first peer-to-peer module assigned to the first gateway device and configured to communicate with the peer-to-peer application, wherein the peer-to-peer application comprises a roaming controlling means executed by at least two of the nodes of the peer-to-peer network and configured to control a roaming process based on the charging data set provided to the peer-to-peer application by means of the first peer-to-peer module, wherein the charging data set comprises at least one peer-to-peer identifier assigned to a user of a vehicle to be charged or discharged and/or a vehicle to be charged or discharged of a user, wherein controlling a roaming process comprises at least initiating an authentication action, wherein the authentication action comprises evaluating the validity of the peer-to-peer identifier, based on the peer-to-peer identifier, and wherein the at least one peer-to-peer application is a block chain or decentral ledger comprising at least two blocks coupled to each other.

18. A gateway device assigned to a charging subsystem of a charging system, in particular, a charging system according to claim 17, comprising:

at least one communication module configured to receive at least one charging data set from at least one charging station, at least one peer-to-peer module configured to provide the charging data set to at least one peer-to-peer application such that a roaming process is controllable by a roaming controlling means executed by at least two of the nodes of the peer-to-peer network based on the provided charging data set, wherein the charging data set comprises at least one peer-to-peer identifier assigned to a user of a vehicle to be charged or discharged and/or a vehicle to be charged or discharged of a user, wherein controlling a roaming process comprises at least initiating an authentication action, wherein the authentication action comprises evaluating the validity of the peer-to-peer identifier, based on at least the peer-to-peer identifier, and wherein the at least one peer-to-peer application is a block chain or decentral ledger comprising at least two blocks coupled to each other.

19. A peer-to-peer application of a peer-to-peer network, the peer-to-peer application comprising:

at least one roaming controlling means executable by at least two of the nodes of the peer-to-peer network and configured to control a roaming process based on a charging data set provided by at least one peer-to-peer module assigned to a gateway device, wherein the charging data set comprises at least one peer-to-peer identifier assigned to a user of a vehicle to be charged or discharged and/or a vehicle to be charged or discharged of a user, wherein controlling a roaming process comprises at least initiating an authentication action, wherein the authentication action comprises evaluating the validity of the peer-to-peer identifier, based on the peer-to-peer identifier, and wherein the at least one peer-to-peer application is a block chain or decentral ledger comprising at least two blocks coupled to each other.

* * * * *